United States Patent
Hata

(10) Patent No.: US 7,315,673 B2
(45) Date of Patent: Jan. 1, 2008

(54) OPTICAL MULTIPLEXER/DEMULTIPLEXER AND METHOD OF MANUFACTURING THE SAME

(75) Inventor: Kenjiro Hata, Tokyo (JP)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 10/972,512

(22) Filed: Oct. 26, 2004

(65) Prior Publication Data

US 2005/0147345 A1 Jul. 7, 2005

(30) Foreign Application Priority Data

Oct. 30, 2003 (JP) ............................ 2003-370854
Sep. 16, 2004 (JP) ............................ 2004-269666

(51) Int. Cl.
*G02B 6/26* (2006.01)

(52) U.S. Cl. ............................ 385/24; 385/33; 385/16; 385/47

(58) Field of Classification Search ............ 395/15, 395/16, 24, 31, 37, 39, 42–51, 147
See application file for complete search history.

(56) References Cited

U.S. PATENT DOCUMENTS

| | | | |
|---|---|---|---|
| 4,701,001 A | 10/1987 | Verhoeven | |
| 4,880,289 A * | 11/1989 | Imoto et al. ................ | 398/42 |
| 6,496,623 B2 * | 12/2002 | Asakura et al. ............. | 385/47 |
| 6,748,132 B1 * | 6/2004 | Kapany et al. ............. | 385/24 |
| 6,952,513 B2 * | 10/2005 | Murphy et al. ............. | 385/52 |

FOREIGN PATENT DOCUMENTS

| | | |
|---|---|---|
| JP | U-1-92608 | 6/1989 |
| JP | A-9-159855 | 6/1997 |
| JP | A 11-38262 | 2/1999 |
| JP | A-2001-343551 | 12/2001 |
| JP | A-2002-14253 | 1/2002 |
| JP | A-2002-303772 | 10/2002 |
| JP | A-2003-131083 | 5/2003 |
| JP | A 2003-139962 | 5/2003 |

* cited by examiner

*Primary Examiner*—Kevin S. Wood
(74) *Attorney, Agent, or Firm*—Oliff & Berridge PLC

(57) ABSTRACT

An optical multiplexer/demultiplexer is provided, which is easy to assemble and which can be manufactured with high productivity and a low cost. An optical multiplexer/demultiplxer includes a substrate formed with V-shaped grooves, optical fibers with a lens provided in tight contact with the V-shaped grooves, optical fiber securing plates, a base groove formed across the V-shaped grooves and an optical filter provided in the groove. First and second optical fibers with a lens are provided on either side of the base groove, and a third optical fiber is provided on the other side of the base groove. The optical fibers are provided such that the positions of their ends coincide with edges of the base groove. The third optical fiber with a lens is provided coaxially with the first optical fiber with a lens that is located on the other side of the base groove. The second optical fiber with a lens is provided in a position in which it is in a line symmetrical relationship with the first optical fiber with a lens, the direction perpendicular to the base groove being the axis of symmetry. The ends of the optical fibers with a lens are formed at an angle such that lines normal to the end faces are orthogonal to the base groove.

23 Claims, 13 Drawing Sheets

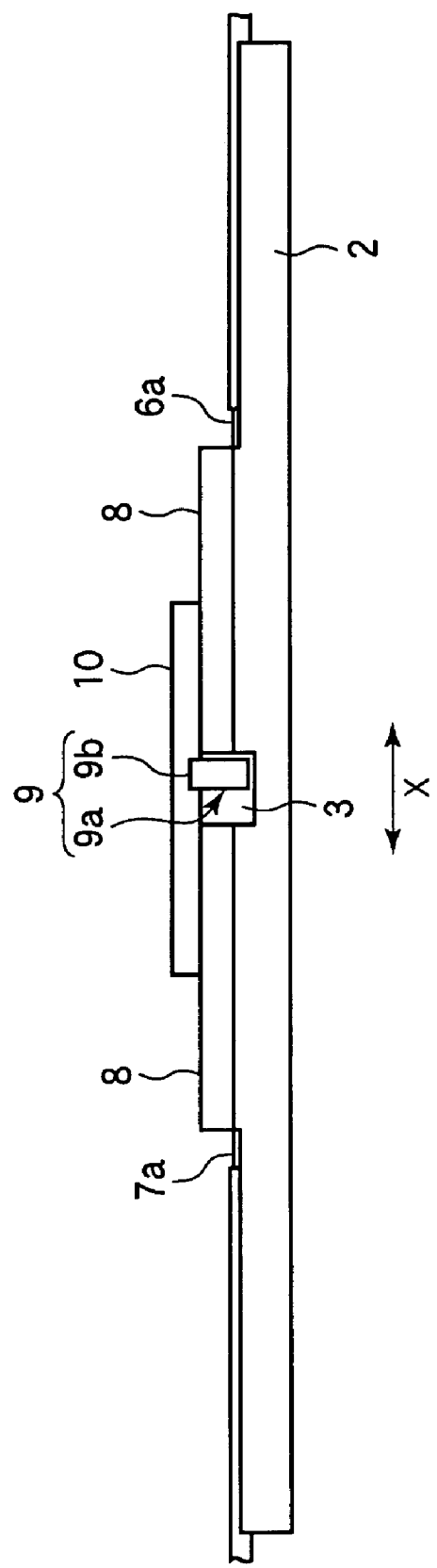

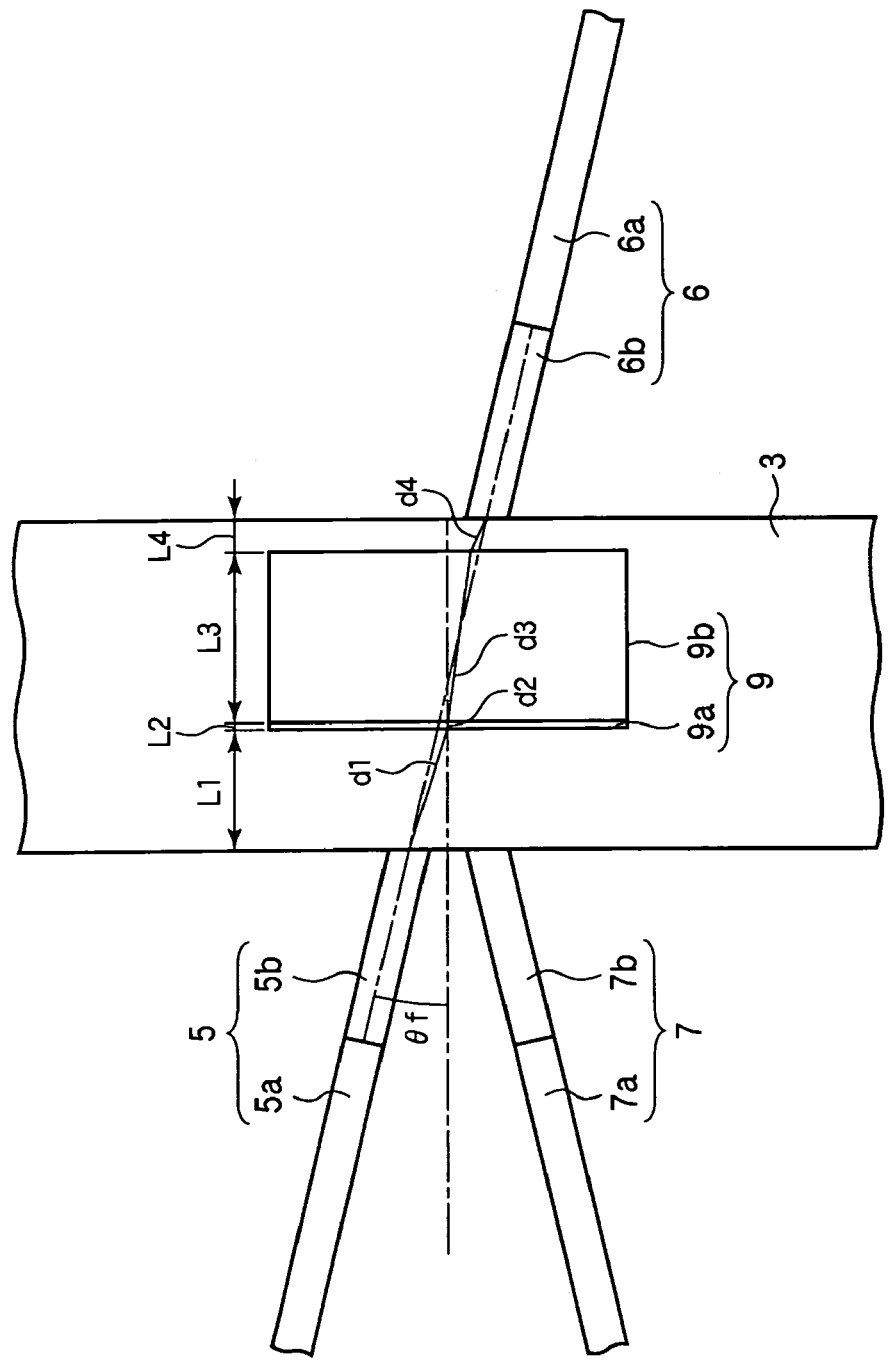

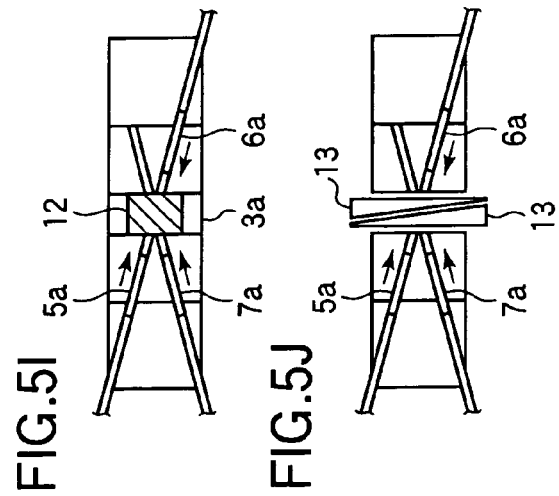
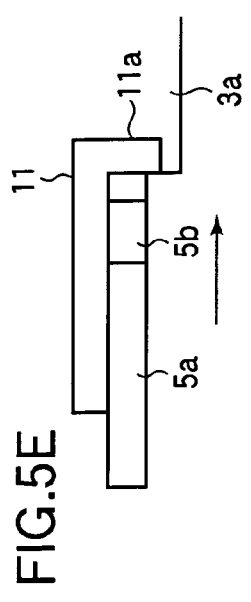
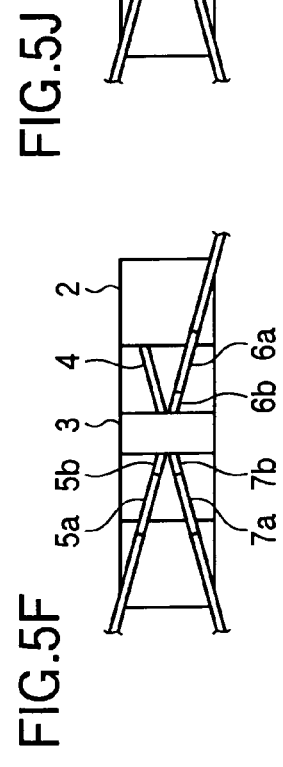
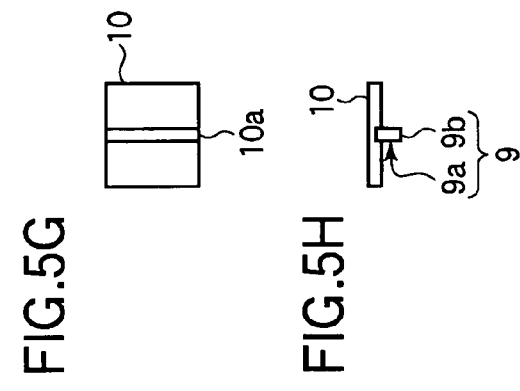
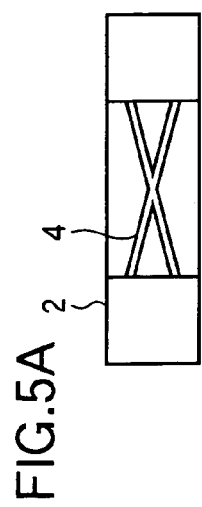
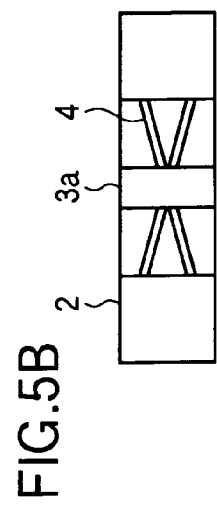

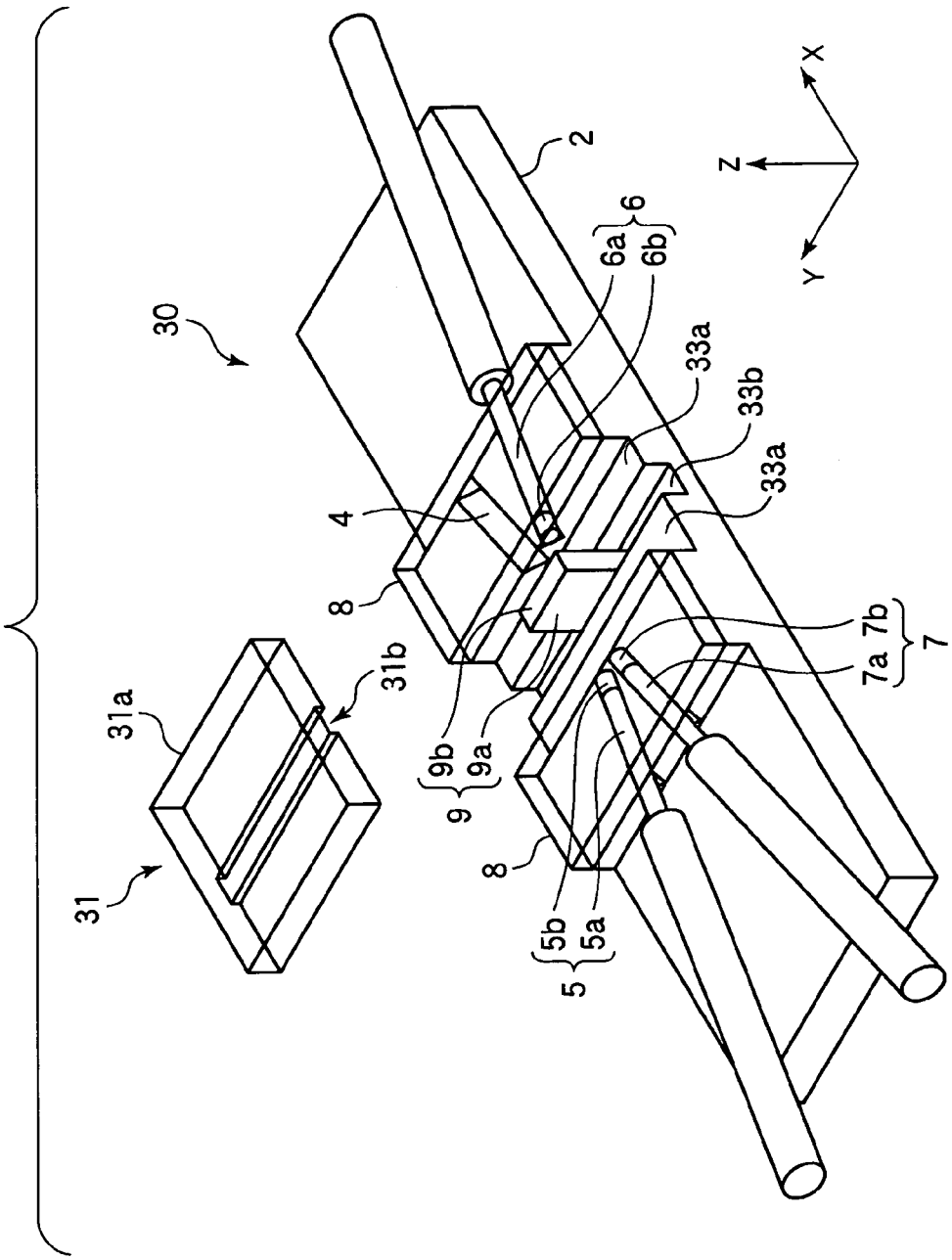

OPTICAL MULTIPLEXER/DEMULTIPLEXER AND METHOD OF MANUFACTURING THE SAME

BACKGROUND OF THE INVENTION

1. Field of the Invention

The present invention relates to an optical multiplexer/demultiplexer utilizing optical fibers used for optical communication.

2. Description of the Related Art

An optical multiplexer/demultiplexer utilizing an optical fiber multiplexes a plurality of light beams or demultiplexes light into a plurality of beams. An optical multiplexer/demultiplexer provided for multiplexing is used to multiplex a plurality of light beams, and the light obtained by multiplexing is transmitted to an optical fiber. Another optical multiplexer/demultiplexer provided for demultiplexing is used to demultiplex the light transmitted through the optical fiber, and the demultplexed beams are transmitted to respective separate optical fibers.

In general, an optical multiplexer/demultiplexer utilizing optical fibers comprises a plurality of optical fibers, an optical filter for transmitting and reflecting light, and a lens. Light which has exited an end face of one of the optical fibers is converged or collimated by the lens such that it will not be spread, and the light reaches the optical filter to be demultiplexed into transmitted light that is transmitted by the optical filter and reflected light that is reflected by the same. The transmitted light and the reflected light thus demultiplexed by the optical filter are converged by a lens to impinge upon end faces of other respective optical fibers. Signal light is thus demultiplexed. Beams of light are multiplexed when they propagate in the direction opposite to that described above.

For example, such an optical multiplexer/demultiplexer is used in a WDM (Wavelength Division Multiplexing) transmission system. According to WDM transmission techniques, since a plurality of optical signals having different wavelengths are transmitted on a multiplex basis over a single optical fiber, the transmission capacity can be increased by an amount corresponding to the number of the wavelengths multiplexed. In order to provide such a WDM transmission system, an optical device such as an optical multiplexer/demultiplexer is required.

However, in the case of the above-described optical multiplexer/demultiplexer, it has been necessary to adjust the optical system or to align the optical axes of the optical fibers in order to allow transmitted light and reflected light demultiplexed by the optical filter to impinge upon the respective optical fibers efficiently. Further, there is a need for a housing for supporting and securing components such as the optical fibers and the optical filter, which has resulted in a problem in that the optical multiplexer/demultiplexer becomes large-sized and in that the optical multiplexer/demultiplexer involves a great number of constituent components and a great number of assembling steps.

As a solution to the above-described problems, a method is known, in which a graded index lens is attached to an end face of an optical fiber and in which an optical fiber ferrule and an optical filter are integrated at an end face of the graded index lens to reduce the size of an optical multiplexer/demultiplexer and the number of steps for assembling the same (Patent Document 1).

Another method is known, in which two single-mode optical fibers including a graded index optical fiber (hereinafter referred to as a "GI fiber") attached on the end thereof are provided on one side of an optical filter constituted by a dielectric multi-layer film and another single-mode optical fiber is provided on another side of the filter and in which an end face of each of the GI fibers is processed such that it is at an angle to the optical axis of the fiber (Patent Document 2)

Patent Document 1: JP-A-2003-139962 (paragraphs [0023] to [0034], FIG. 1)

Patent Document 2: JP-A-11-38262 (paragraphs [0013] to [0025], FIG. 1)

SUMMARY OF THE INVENTION

In the case of the optical multiplexer/demultiplexer disclosed in Patent Document 1, since transmitted light and reflected light are controlled by providing the optical fiber off the center of the graded index lens, there is a need for processing each of the constituent members (the optical fiber, the ferrule supporting the same, the graded index lens, and the optical filter) with high accuracy in advance and a need for a great number of aligning steps for configuring them accurately, which has resulted in a problem in that a long time is required to assemble the optical multiplexer/demultiplexer.

In the case of the optical multiplexer/demultiplexer disclosed in Patent Document 2, although it can sufficiently prevent any unnecessary reflected return light to an optical fiber, there is a need for processing the end faces of the GI fibers with high accuracy to adjust the angles of the end faces, which has resulted in the problem of a reduction in productivity.

The invention solves the above-described problems, and it is an object of the invention to provide an optical multiplexer/demultiplexer which can be easily assembled with high productivity and which can be configured with inexpensive components to achieve a low cost.

The above-described object is achieved by an optical multiplexer/demultiplexer characterized in that it has a substrate, a base groove formed on the substrate, a first linear positioning groove formed on the substrate, the first positioning groove being formed on a first side of the base groove at a predetermined angle to the base groove, a second linear positioning groove formed on the substrate, the second positioning groove being formed on a second side of the base groove oppositely to and coaxially with the first positioning groove, a third linear positioning groove formed on the substrate and on the first side of the base groove such that it is at a smaller distance to the first positioning groove as it becomes closer to the base groove, an optical element provided in the base groove for multiplexing or/and demultiplexing light, a first optical fiber with a lens provided in the first positioning groove, the first optical fiber having a graded index lens attached to an end thereof and facing the base groove at an end face thereof, a second optical fiber with a lens provided in the second positioning groove, the second optical fiber having a graded index lens attached to an end thereof and facing the base groove at an end face thereof, and a third optical fiber with a lens provided in the third positioning groove, the third optical fiber having a graded index lens attached to an end thereof and facing the base groove at an end face thereof.

In such an optical multiplexer/demultiplexer, light which has exited the first optical fiber with a lens impinges upon the optical element. A part of the light is transmitted through the optical element, and another part of the light is reflected by the optical element. The light transmitted through the optical element impinges upon the second optical fiber with a lens, and the light reflected by the optical element impinges upon the third optical fiber with a lens. Thus, a single beam of light is demultiplexed into two beams of light.

Light which has exited the second optical fiber with a lens is transmitted through the optical element to impinge upon the first optical fiber with a lens. Further, light which has exited the third optical fiber with a lens is reflected by the optical element to impinge upon the first optical fiber with a lens. Thus, two beams of light are multiplexed into a single beam of light.

An optical multiplexer/demultiplexer according to the invention is characterized in that, the end faces of the first through third optical fibers with a lens are formed at an angle to the optical axes of the first through third optical fibers with a lens such that lines normal to the end faces are orthogonal to the optical element.

In such an optical multiplexer/demultiplexer, light which has exited an optical fiber with a lens is reflected by the end face thereof. However, since the end face is formed at an angle to the optical axis, the light reflected by the end face is reflected at an angle to the optical axis (light-receiving angle) of the optical fiber with a lens, and the light is therefore hardly coupled to the optical fiber with a lens.

An optical multiplexer/demultiplexer according to the invention is characterized in that, the optical element is a thin film provided on an optical element substrate and in that the thickness (represented by L3) of the optical element substrate satisfies the following equation:

$$L3 = [(\tan \theta f - \tan \theta 1)(L1+L4) + (\tan \theta f - \tan \theta 2) \times L2]/(\tan \theta 3 - \tan \theta f)$$

where $\theta 1 = \sin^{-1}\{(n0 \times \sin \theta f)/n1\}$; $\theta 2 = \sin^{-1}\{(n0 \times \sin \theta f)/n2\}$; and $\theta 3 = \sin^{-1}\{(n0 \times \sin \theta f)/n3\}$, L1 representing the distance from the first optical fiber with a lens to the thin film, L2 representing the thickness of the thin film, L3 representing the thickness of the optical element substrate, L4 representing the distance from the optical element substrate to the second optical fiber with a lens, n0 representing the axial refractive index of the graded index lenses, n1 representing the refractive index in the base groove, n2 representing the effective refractive index of the thin film, n3 representing the refractive index of the optical element substrate, $\theta f$ representing the predetermined angle.

Since the end face of the first or second optical fiber with a lens is inclined at a predetermined angle to the optical axis of the fiber, when light which has exited the first optical fiber with a lens is coupled to the second optical fiber with a lens, an optical misalignment occurs because the light passes through the groove and the optical element which have different refractive indices. A similar optical misalignment also occurs when light which has exited the second optical fiber with a lens is coupled to the first optical fiber with a lens. In the optical multiplexer/demultiplexer according to the invention, however, the optical misalignments can be corrected by changing the ratio of the refractive index in the base groove to the refractive index of the optical element and changing the ratio of the length of the base groove that the light passes through to the length of the optical element.

An optical multiplexer/demultiplexer according to the invention is characterized in that it further includes an inclination adjusting member for adjusting the inclination of the optical element such that light which has exited the first optical fiber with a lens is coupled to the third optical fiber with a lens.

An optical multiplexer/demultiplexer according to the invention is characterized in that the inclination adjusting member includes a flat plate member which extends across the base groove to contact the optical element.

An optical multiplexer/demultiplexer according to the invention is characterized in that the flat plate member has a contact groove in the region thereof where it contacts the optical element.

An optical multiplexer/demultiplexer according to the invention is characterized in that the base groove includes a setting groove in which the optical element is set.

An optical multiplexer/demultiplexer according to the invention is characterized in that the graded index lens is a graded index optical fiber.

An optical multiplexer/demultiplexer according to the invention is characterized in that the optical element is an optical filter or a mirror.

The above-described object is achieved by a method of manufacturing an optical multiplexer/demultiplexer characterized in that it includes the steps of: forming two linear positioning grooves on a substrate by cutting the substrate such that the grooves intersect each other at a predetermined angle; forming a base groove extending across the positioning grooves in the region where the two linear positioning grooves intersect each other; disposing optical fibers with a lens having a graded index lens formed at an end thereof in the positioning grooves such that end faces of the optical fibers with a lens face the base groove; providing a block in the base groove and securing the optical fibers with a lens with the ends of the fibers abutted on the block; cutting the ends of the optical fibers with a lens thus bonded and secured; and mounting an optical element in the base groove between the optical fibers with a lens.

The above-described object is achieved by a method of manufacturing an optical multiplexer/demultiplexer characterized in that it includes the steps of: forming two linear positioning grooves on a substrate by cutting the substrate such that the grooves intersect each other at a predetermined angle; disposing an optical fiber with a lens, which is constituted by optical fibers attached to both ends of a first graded index lens, in one of the positioning grooves and disposing and securing another optical fiber with a lens, which is an optical fiber attached to a second graded index lens, in the other positioning groove; forming a base groove extending across the positioning grooves by cutting an intermediate part of the first graded index lens, an end of the second graded index lens and the substrate and forming another groove within the base groove; and mounting an optical element in the another groove.

A method of manufacturing an optical multiplexer/demultiplexer according to the invention is characterized in that the step of mounting an optical element is followed by the step of moving the optical element in the direction of the width of the base groove to adjust the optical path of light which exits a predetermined optical fiber with a lens and which is reflected by the optical element to be coupled to another optical fiber with a lens.

According to such a manufacturing method, since the position of the optical element is adjusted by moving the optical element in parallel with the width direction of the base groove, it is possible to adjust the optical path of light which exits the first optical fiber with a lens and which is reflected by the optical element to be coupled to the third optical fiber with a lens. A similar adjustment is performed for any optical misalignment of light which exits the third optical fiber with a lens and which is coupled to the first optical fiber with a lens. Even when the optical element is moved in the width direction of the base groove, there is no change in the ratio of refractive index in the base groove to the refractive index of the optical element and in the ratio of the length of the base groove over which light passes through to the length of the optical element. Therefore, no optical misalignment occurs between the first optical fiber with a lens and the third optical fiber with a lens.

A method of manufacturing an optical multiplexer/demultiplexer according to the invention is characterized in that it includes the step of adjusting the optical path of light which has exited a predetermined optical fiber with a lens and which is coupled to another optical fiber with a lens by changing the refractive index of a substance with which the base groove is filled.

The above-described object is achieved by a method of manufacturing an optical multiplexer/demultiplexer characterized in that it includes the steps of: forming a base groove on a substrate; forming the substrate with a first linear positioning groove at a predetermined angle to the base groove, a second linear positioning groove located coaxially with the first positioning groove with the base groove interposed between them, and a third linear positioning groove which defines a smaller gap with the first positioning groove as it becomes closer to the base groove when viewed in parallel with the extending direction of the base groove; disposing and securing first through third optical fibers with a lens each having a graded index lens at an end thereof in the first through third positioning grooves, respectively, such that the graded index lenses are exposed in the base groove; setting an optical element in the base groove; and adjusting the inclination of the optical element such that light which has exited the first optical fiber with a lens is coupled to the third optical fiber with a lens.

A method of manufacturing an optical multiplexer/demultiplexer according to the invention is characterized in that an inclination adjusting member including a flat plate member is placed over the base groove and in that the flat plate member is slid in contact with the optical element in the base groove to incline the optical element.

A method of manufacturing an optical multiplexer/demultiplexer according to the invention is characterized in that the flat plate member is slid across the base groove to incline the optical element relative to a plane including the first through third optical fibers with a lens.

A method of manufacturing an optical multiplexer/demultiplexer according to the invention is characterized in that the flat plate member is rotationally slid to rotate the optical element about an axis substantially orthogonal to the plane including the first through third optical fibers with a lens.

A method of manufacturing an optical multiplexer/demultiplexer according to the invention is characterized in that the graded index lenses are graded index optical fibers.

A method of manufacturing an optical multiplexer/demultiplexer according to the invention is characterized in that the optical element is an optical filter or a mirror.

In the optical multiplexer/demultiplexer according to the invention described above, the optical fibers with a lens can be mounted in accurate positions at accurate angles by forming positioning grooves on the substrate. Further, the optical axes of two optical fibers with a lens that are coaxially provided can be accurately aligned by adjusting the thickness of the optical element without any process for aligning the optical fibers with a lens, which makes it possible to reduce loss during optical coupling. Since no process is required for aligning optical fibers with a lens, time required for assembling an optical multiplexer/demultiplexer can be reduced to improve productivity.

In the optical multiplexer/demultiplexer according to the invention described above, the end face of an optical fiber with a lens is formed at an angle to the optical axis thereof to prevent light which has exited the optical fiber with a lens from being reflected and returned at the end face, which allows a reduction of loss.

Further, in the optical multiplexer/demultiplexer according to the invention described above, the optical axes of two optical fibers with a lens that are coaxially provided can be accurately aligned without any process for aligning the optical fibers with a lens when the thickness of the optical element substrate satisfies the condition for implementing the invention, and it is therefore possible to reduce loss during optical coupling. Specifically, optical misalignments attributable to refraction by each of substances having different refractive indices in the base groove can be cancelled out as a whole, which makes it possible to reduce optical misalignments. Since no process is required for aligning the optical fibers with a lens, time required for assembling the optical multiplexer/demultiplexer can be reduced to improve productivity.

Furthermore, in the optical multiplexer/demultiplexer according to the invention described above, it is possible to adjust any misalignment between the optical axes of the first and third optical fibers with a lens and the optical path of reflected light from the optical element by adjusting the angle of the optical element using the inclination adjusting member. As a result, light which has exited the first optical fiber with a lens and which has been reflected by the optical element can be properly coupled to the third optical fiber with a lens.

The method of manufacturing an optical multiplexer/demultiplexer according to the invention described above allows an optical multiplexer/demultiplexer to be fabricated using a smaller number of steps by processing ends of optical fibers with a lens at the same time when a base groove is formed on a substrate, and it is therefore possible to process the end faces efficiently. Further, since the lengths of the optical fibers with a lens can be controlled when the base groove is formed, it is possible to manufacture optical multiplexers/demultiplexers with optical systems of high reproducibility.

The method of manufacturing an optical multiplexer/demultiplexer according to the invention described above allows misalignment of the optical path of light reflected by an optical element to be reduced at a single step by moving the position of the optical element in the direction of the width of the base groove without any need for aligning optical fibers with a lens. It is therefore possible to reduce time required for assembling an optical multiplexer/demultiplexer.

In the method of manufacturing an optical multiplexer/demultiplexer according to the invention described above, misalignment of the optical path of light can be reduced without any process for aligning optical fibers with a lens by changing the substance with which the base groove is filled to change the refractive index in the base groove. As a result, time required for assembling an optical multiplexer/demultiplexer can be reduced.

In the method of manufacturing an optical multiplexer/demultiplexer according to the invention described above, since the angle of the optical element can be adjusted using an inclination adjusting member 31, the angle of incidence of light from the first optical fiber with a lens upon the optical element can be adjusted even when the optical element is disposed in the base groove at a certain inclination or when there is a deviation of the exiting angle of the light exiting the first optical fiber with a lens because of eccentricity of the optical axis of the fiber. As a result, light which has exited the first optical fiber with a lens and which has been reflected by the optical element can be properly coupled to the third optical fiber with a lens.

BRIEF DESCRIPTION OF THE DRAWINGS

FIG. 3 is a side view of the optical multiplexer/demultiplexer in the first mode for carrying out the invention;

FIG. 4 is a plan view of optical fibers and an optical filter of the optical multiplexer/demultiplexer in the first mode for carrying out the invention showing a disposition thereof;

FIGS. 5A to 5J show a method of manufacturing an optical multiplexer/demultiplexer in the first mode for carrying out the invention;

FIG. 8 is a perspective view of an optical multiplexer/demultiplexer in a third mode for carrying out the invention showing a schematic configuration thereof;

DESCRIPTION OF THE PREFERRED EMBODIMENTS

An optical multiplexer/demultiplexer and a method of manufacturing an optical multiplexer/demultiplexer according to embodiments of the invention will be explained below with reference to FIG. 1 to FIG. 7E.

<First Mode for Carrying Out the Invention>

A first mode for carrying out the invention will now be described with reference to FIGS. 1 to 5J.

(Configuration)

Figure 1:
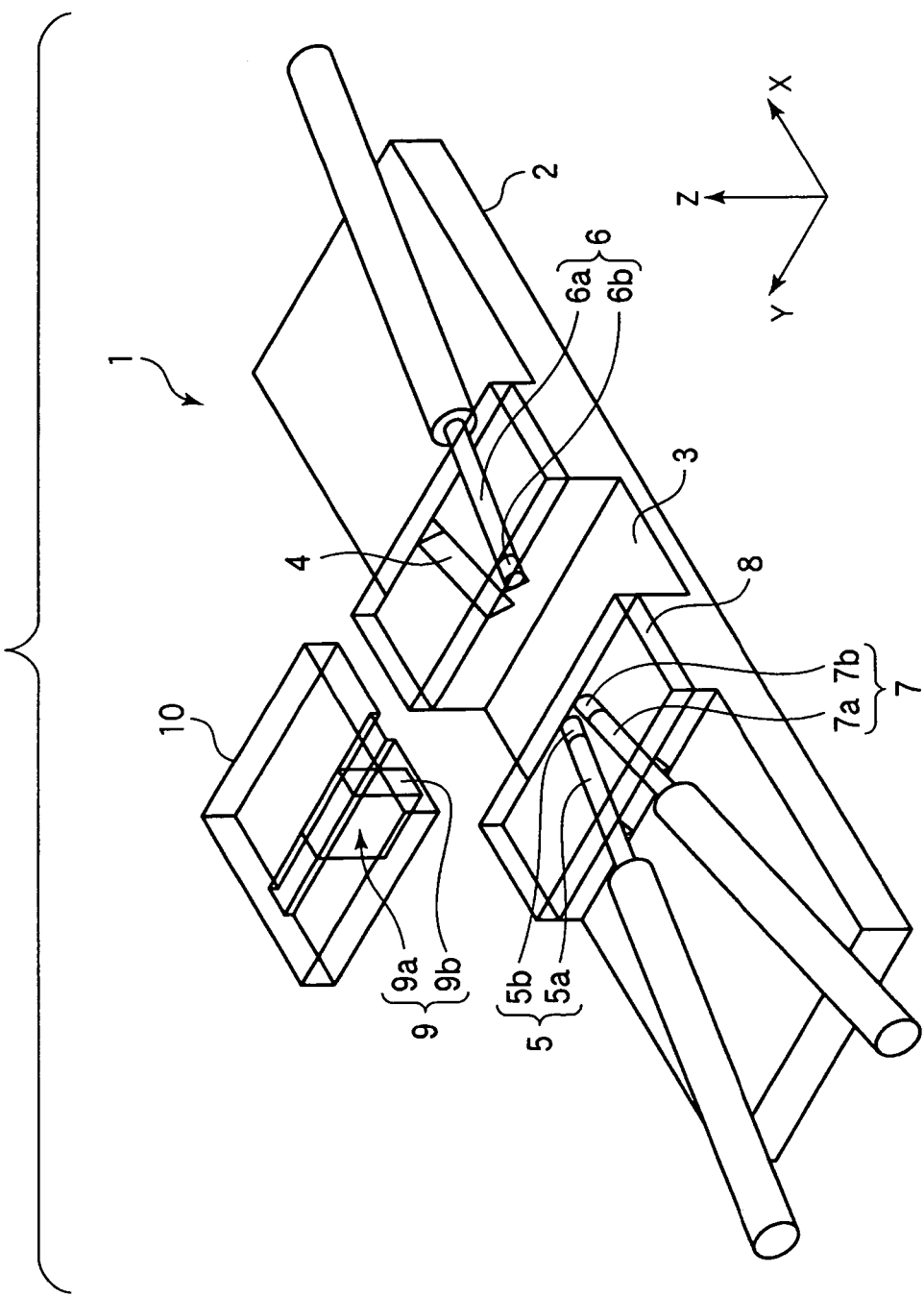
FIG. 1 is a perspective view of an optical multiplexer/demultiplexer in a first mode for carrying out the invention showing a schematic configuration thereof.
Figure 2:
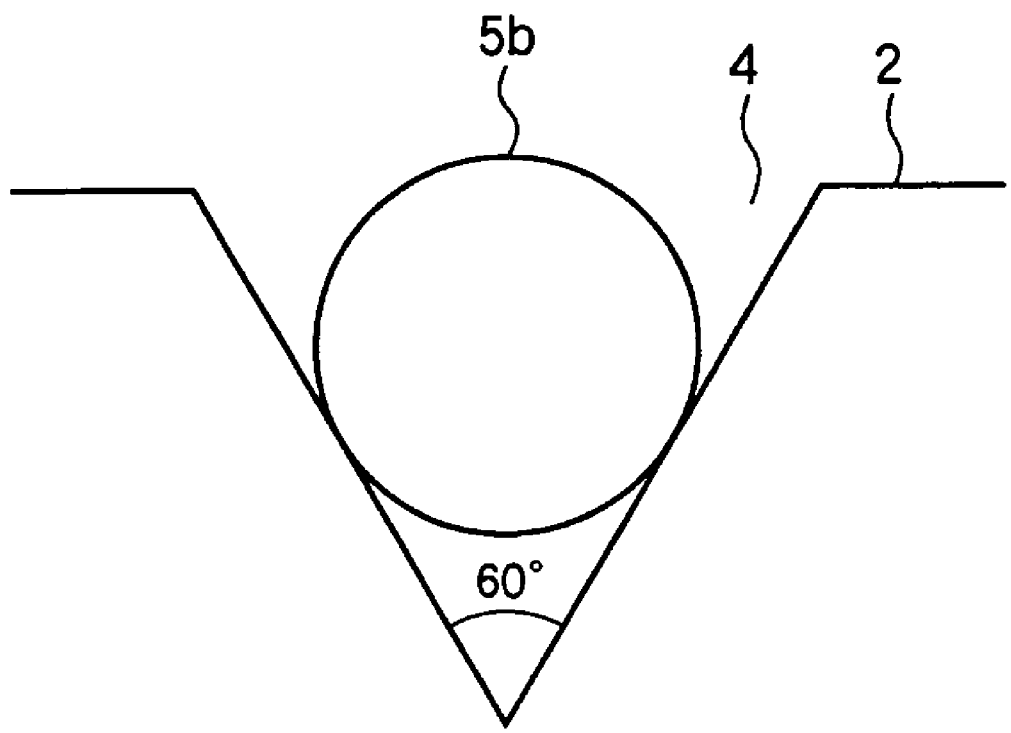
FIG. 2 is a sectional view of a groove of a substrate used in the optical multiplexer/demultiplexer in the first mode for carrying out the invention.

A configuration of an optical multiplexer/demultiplexer in the first mode for carrying out the invention will now be described with reference to FIGS. 1 to 4. FIG. 1 is a perspective view of the optical multiplexer/demultiplexer in the first mode for carrying out the invention showing a schematic configuration thereof. FIG. 2 is a sectional view of a substrate used in the optical multiplexer/demultiplexer according in the first mode for carrying out the invention showing a V-shaped groove on the substrate. FIG. 3 is a side view of the optical multiplexer/demultiplexer in the first mode for carrying out the invention. FIG. 4 is a plan view of the optical multiplexer/demultiplexer in the first mode for carrying out the invention showing the neighborhood of a base groove in an enlarged scale.

As shown in FIG. 1, an optical multiplexer/demultiplexer 1 in the present mode for carrying out the invention comprises a substrate 2 formed with a plurality of V-shaped grooves 4 having a V-shaped cross section, optical fibers 5, 6 and 7 with a lens provided in tight contact with the V-shaped grooves 4, optical fiber securing plates 8 for securing the optical fibers 5, 6 and 7 with a lens from above the substrate 2, and a base groove 3 formed across the V-shaped grooves 4. The device further comprises an optical element substrate 9b which is removably provided in the base groove 3 and an optical element substrate securing plate 10 for securing the optical element substrate 9b.

The optical fibers 5, 6 and 7 with a lens are comprised of respective single-mode optical fibers 5a, 6a and 7a, and GI fibers 5b, 6b and 7b that are graded index lenses securely fusion-bonded to ends of the respective single-mode optical fibers.

The GI fibers 5b to 7b are graded index optical fibers having a refractive index profile in the radial direction of their optical axes, and the refractive index profile of such a GI fiber is expressed by Equation 1 shown below.

$$n(r)=n0(1-(A/2)r^2) \qquad \text{Equation 1}$$

where r represents the radius from the center axis of the fiber and n0 represents the axial refractive index. $A^{1/2}$ represents an refractive index profile constant which satisfies $A^{1/2}=(2\Delta)^{1/2}/r$ when the refractive index has a quadratic profile. The ratio of refractive index difference $\Delta$ satisfies:

$$\Delta=\{n(0)^2-n(r)^2\}/\{2n(0)^2\}$$

The GI fibers have a function of transforming divergent light beams exiting the single-mode optical fibers into parallel light beams or converging light beams, or transforming parallel light beams entering the optical fibers into converging light beams.

The substrate 2, the optical fiber securing plates 8 and the optical element substrate securing plate 10 are made of tempax glass. A thin film 9a (not shown) which is a dielectric multi-layer film is provided on a surface of the optical element substrate 9b (a surface facing the optical fibers 5 and 7 with a lens). For example, BK7 is used as the optical element substrate 9b. The combination of the optical element substrate 9b and the thin film 9a corresponds to an "optical filter" 9 as an "optical element" according to the invention.

FIG. 2 shows a sectional configuration of a V-shaped groove 4 provided on the substrate 2. As shown in the same figure, the vertex of the V-shaped groove 4 has an angle of about 60°. The optical fibers 5 to 7 with a lens are provided in such V-shaped grooves 4 in tight contact therewith, and the optical fiber securing plates 8 (not shown) for holding the optical fibers 5 to 7 with a lens are provided on the optical fibers 5 to 7 with a lens.

FIG. 3 is a side view of the optical multiplexer/demultiplexer 1. The optical element substrate 9b is provided in the groove 3, and the optical element substrate 9b is secured by the optical element substrate securing plate 10. Since the thickness of the optical element substrate 9b is smaller than the width of the groove 3, the optical element substrate securing plate 10 can be moved in the direction of the width of the groove 3 (X direction in FIG. 3).

FIG. 4 is a plan view of the optical multiplexer/demultiplexer 1 showing the substrate in the vicinity of the groove 3 in an enlarged scale. As shown in the same figure, the optical element substrate 9b is provided in the groove 3 in parallel with the groove 3. The optical fibers 5 and 7 with a lens are provided on one side of the optical element substrate 9b, and the optical fiber 6 with a lens is provided on the other side of the same. The optical fibers 5 to 7 with a lens are provided such that their ends are positioned at an edge of the groove 3. Further, the optical fiber 6 with a lens is provided coaxially with the optical fiber 5 with a lens, the groove 3 (the optical element substrate 9b) being interposed between them. The optical fiber 7 with a lens is provided in a position in which it is in a line-symmetric relationship with the optical fiber 5 with a lens, the axis of symmetry being the direction perpendicular to the groove 3 (the optical element substrate 9b).

The optical fibers 5 to 7 with a lens are provided such that an angle $\theta_f$ is defined between the optical axes of the optical fibers 5 to 7 with a lens and the direction perpendicular to the groove 3 (the optical element substrate 9b). The ends of the optical fibers 5 to 7 with a lens are formed at an angle such that lines normal to the end faces are orthogonal to the groove 3 (the optical element substrate 9b). Therefore, the ends are inclined such that the lines normal to the end faces are at the angle $\theta_f$ to the optical axes of the optical fibers 5 to 7 with a lens.

Further, the thin film 9a which is a dielectric multi-layer film is provided on a surface of the optical element substrate 9a (a surface facing the optical fibers 5 and 7 with a lens). The thin film 9a may alternatively be provided on the opposite side (a surface facing the optical fiber 6 with a lens) instead of the surface facing the optical fibers 5 and 7 with a lens.

Let us now assume that L2 represents the thickness of the thin film 9a; L3 represents the thickness of the optical element substrate 9b; L1 represents the distance from the optical fibers 5 and 7 with a lens to the thin film 9a; and L4 represents the distance from the optical element substrate 9b to the optical fiber 6 with a lens. Then, the width of the groove 3 equals L1+L2+L3+L4. Let us also assume that n1 represents the refractive index of a material with which the gap between the optical fibers 5 and 7 with a lens and the thin film 9a is filled; n2 represents the effective refractive index of the thin film 9a; n3 represents the refractive index of the optical element substrate 9b; n4 represents the refractive index of a material with which the gap between an edge of the optical element substrate 9b and the optical fiber 6 with a lens is filled; and n0 represents the axial refractive index of the optical fibers 5 to 7 with a lens. In the present mode for carrying out the invention, n1 equals n4.

Since the thin film 9a is a dielectric multi-layer film constituted by a stack of dielectric films having different refractive indices, the refractive index of the thin film 9a is represented by the effective refractive index n2 which indicates the refractivity of the multi-layer film as a whole.

The optical element substrate 9b is provided such that the thin film 9a is located in the position of a beam waist of light exiting a GI fiber 5b (the position in which the beam has the smallest spot size). Let us now assume that "d" represents a distance that a beam travels in the atmosphere (whose refractive index is 1) to reach a beam waist from an end face of a GI fiber. The distance "d" depends on the refractive index and length of the GI fiber. When the GI fibers have the same refractive index and length, the optical fibers with a lens have the same optical characteristics. When an optical distance "da" between two optical fibers (hereinafter referred to as an "optical fiber coupling distance") in the atmosphere (whose refractive index is 1) satisfies a relationship expressed by "da=2×(distance d)", the light from either of the optical fibers with a lens has a minimum coupling loss when it enters the other optical fiber with a lens.

(Opperations)

The optical multiplexer/demultiplexer 1 having the above-described configuration can provide preferable operations as described below. In the present mode for carrying out the invention, the optical multiplexer/demultiplexer 1 will be described with reference to a case in which it is used as a demultiplexer.

For example, the optical fiber 5 with a lens is used as an optical fiber for exiting light beams; the optical fiber 6 with a lens is used as an optical fiber for transmitted light beams; and the optical fiber 7 with a lens is used as an optical fiber for a reflected light beam.

In such a configuration, since the end face of the optical fiber 5 with a lens is processed at an angle, light which has exited the optical fiber 5 with a lens is refracted to enter the thin film 9a constituted by a dielectric multi-layer film. The light exits the end face of the optical fiber 5 with a lens at an angle $\theta1$ and enters the thin film 9a at the angle $\theta1$. As shown in FIG. 4, the light travels an optical path length d1 at this time and propagates in the thin film 9a at an angle $\theta2$.

Since the end face of the optical fiber 5 with a lens is processed at an angle, light reflected by the end face of the optical fiber 5 with a lens will not return into the optical fiber 5 with a lens. It is therefore possible to suppress any reflected return light.

Light having a certain wavelength is transmitted by the thin film 9a, and light having a different wavelength is reflected by the thin film 9a. The length of the optical path for the transmitted light in the thin film 9a is represented by d2. The transmitted light transmitted by the thin film 9a is further transmitted by the optical element substrate 9b, and the light thereafter enters the optical fiber 6 with a lens provided coaxially with the optical fiber 5 with a lens. When the light enters the optical element substrate 9b from the thin film 9a, the angle of incidence is $\theta2$. The light travels an optical path length d3 in the optical element substrate 9b and propagates at an angle $\theta3$ in the optical element substrate 9b. The light travels an optical path length d4 from the optical element substrate 9b to the optical fiber 6 with a lens and enters the optical fiber 6 with a lens at an angle $\theta4$.

As thus described, the light which has exited the optical fiber 5 with a lens is demultiplexed into transmitted light and reflected light at the thin film 9a. The transmitted light enters the optical fiber 6 with a lens, and the reflected light enters the optical fiber 7 with a lens. The transmitted light and the reflected light can deviate from the optical axes of the optical fibers 6 and 7 with a lens, respectively, which can result in coupling loss.

At this time, the optical distance between the optical fiber 5 with a lens and the optical fiber 6 with a lens or optical fiber coupling distance "da" satisfies the following equation:

$$da = d1/n1 + d2/n2 + d3/n3 + d4/n4$$

Therefore, when the optical fiber coupling distance "da" satisfies a relationship expressed by da=2×(distance d), the coupling loss is minimal. In the present mode for carrying out the invention, the thin film 9a is provided in a position where the light exiting the optical fiber 5 with a lens has the smallest spot size. Therefore, the optical element substrate 9b is provided such that the thin film 9a is located in a position where an equation "d1=(distance d)×n1" holds true.

When the thickness L3 of the optical element substrate 9b satisfies the equation (condition) shown below, da=d1/n1+d2/n2+d3/n3+d4/n4=2×(distance d), and the deviation of the transmitted light from the optical axis of the optical fiber 6 with a lens can therefore be corrected to minimize the coupling loss.

(Condition)

$$L3 = [(\tan \theta f - \tan \theta 1)(L1+L4) + (\tan \theta f - \tan \theta 2) \times L2] / (\tan \theta 3 - \tan \theta f)$$

where $\theta 1 = \sin^{-1}\{(n0 \times \sin \theta f)/n1\}$; $\theta 2 = \sin^{-1}\{(n0 \times \sin \theta f)/n2\}$; and $\theta 3 = \sin^{-1}\{(n0 \times \sin \theta f)/n3\}$.

The deviation from the optical axis becomes "0" when a thickness L3 is chosen to satisfy the above-described condition with respect to the value L1 or the like which have been arbitrarily set.

A method for deriving the thickness L3 of the optical element substrate 9b will now be described. As shown in FIG. 1, the optical multiplexer/demultiplexer 1 has the V-shaped grooves 4 formed on a surface of the substrate 2 in which the optical fibers 5, 6 and 7 with a lens are to be mounted. Therefore, the optical axes of the optical fibers 5, 6 and 7 with a lens are all included in the same plane (or at the same Z-coordinate).

The optical fibers 5, 6 and 7 with a lens are configured by providing GI fibers 5b, 6b and 7b having the same diameter at ends of single-mode optical fibers 5a, 6a and 7a, respectively. What is required is to provide graded index lenses at the ends of the single-mode optical fibers 5a, 6a and 7a, and the GI fibers 5b, 6b and 7b may therefore be replaced by, for example, GRIN lenses. The GI fibers 5b, 6b and 7b are configured to have index profiles in which their refractive indices are at the maxima at their axis centers and decrease toward the peripheries thereof (quadratic profiles). In the optical fibers 5, 6 and 7 with a lens, the single-mode optical fibers 5a, 6a and 7a and the respective GI fibers 5b, 6b and 7b are disposed such that their centers are aligned with each other. Therefore, the optical axes of entrance/exit ends of the GI fibers 5b, 6b and 7b are also aligned with the optical axes of the single-mode optical fibers 5a, 6a and 7a, respectively.

The exit end faces of the optical fibers 5, 6 and 7 with a lens are flush with side surfaces of the groove 3 which are at predetermined angles to the V-shaped grooves 4. The side surfaces of the groove 3 are formed such that they are substantially perpendicular to the surfaces of the substrate 2 on which the V-shaped grooves 4 are formed when viewed in the depth direction of the groove (Z-direction). The angle of refraction (exit angle) of a light beam exiting the exit end of the optical fiber 5 with a lens into the space in the groove 3 varies depending on the angle defined by the V-shaped groove 4 and the groove 3 and the refractive index of the space in the groove 3. The optical multiplexer/demultiplexer 1 may be at an angle about the Y-axis relative to the Z-axis due to errors in manufacture, errors in processing and errors in device mounting, and fabrication techniques are adopted to configure the device with the smallest possible angle about the Y-axis. Therefore, the light beam will be subjected to substantially no refraction in the direction perpendicular to the optical axis of the optical fiber 5 with a lens (the direction of the Z-axis) and will be refracted in the direction of the Y-axis relative to the beam direction (X-axis). As a result, in such a configuration of the optical multiplexer/demultiplexer 1, the exiting light beam thus refracted and the optical axes of the optical fibers 5, 6 and 7 with a lens are all located on the same plane (two-dimensional).

The thickness L3 of the optical element substrate 9b of the optical multiplexer/demultiplexer 1 having such a configuration will now be derived with reference to FIG. 4. Let us assume that the coordinate (X, Y) of the optical axis of the optical fiber 5 with a lens in the light entering/exiting position is (0, 0) and that the coordinate (X, Y) of the optical axis of the second optical fiber 6 with a lens in the light entering/exiting position is (La, Ya). The light entering/exiting position Ya of the second optical fiber 6 with a lens is expressed by Equation 2 shown below using the angle θf defined by the optical axes of the optical fibers 5 and 6 with a lens and the direction perpendicular to the groove 3 (the optical element substrate 9b) because tan θf=Ya/La:

$$Ya = \tan \theta f \times La \qquad \text{Equation 2}$$

A state in which the center of the light beam from the optical fiber 5 with a lens has reached the position where (X, Y)=(La, Ya) will be referred to as a "state without optical misalignment". Further, it is assumed that the boundary between the refractive indices of the groove 3 and the thin film 9a, the boundary between the reflective indices of the thin film 9a and the optical element substrate 9b, and the boundary between the refractive indices of the optical element substrate 9b and the groove 3 are in parallel with the side surface of the groove 3 on which the optical fiber 5 with a lens is exposed. In the state without optical misalignment, the light entering/exiting position La of the second optical fiber 6 with a lens is given by:

$$La = L1 + L2 + L3 + L4 \qquad \text{Equation 3}$$

Equation 2 is developed as follows by substituting Equation 3 into the same.

$$Ya = \tan \theta f (L1 + L2 + L3 + L4) \qquad \text{Equation 4}$$
$$= (\tan \theta 1 \times L1) + (\tan \theta 2 \times L2) + (\tan \theta 3 \times L3) + (\tan \theta 4 \times L4)$$

According to the Snell's law, the angle θ1 of light exiting the end face of the optical fiber 5 with a lens, the angle θ2 at which the light propagates in the thin film 9a, the angle θ3 at which the light propagates in the optical element substrate 9b and the angle θ4 at which the light enters the optical fiber 6 with a lens as described in the note for the above conditional expression can be expressed by Equations 5 to 8 shown below.

$$\theta 1 = \sin^{-1}\{(n0 \times \sin \theta f)/n1\} \qquad \text{Equation 5}$$

$$\theta 2 = \sin^{-1}\{(n0 \times \sin \theta f)/n2\} \qquad \text{Equation 6}$$

$$\theta 3 = \sin^{-1}\{(n0 \times \sin \theta f)/n3\} \qquad \text{Equation 7}$$

$$\theta 4 = \sin^{-1}\{(n0 \times \sin \theta f)/n4\} \qquad \text{Equation 8}$$

Equation 4 can be rewritten as follows.

$$\{\tan \theta f (L1 + L2 + L3 + L4)\} - \qquad \text{Equation 9}$$
$$\{(\tan \theta 1 \times L1) + (\tan \theta 2 \times L2) +$$
$$(\tan \theta 3 \times L3) + (\tan \theta 4 \times L4)\} = 0$$

Equation 9 can be rearranged with respect to L1, L2, L3 and L4 as follows.

$$(\tan\theta f - \tan\theta 1)L1 + (\tan\theta f - \tan\theta 2)L2 + (\tan\theta f - \tan\theta 3)L3 + (\tan\theta f - \tan\theta 4)L4 = 0 \quad \text{Equation 10}$$

In the optical multiplexer/demultiplexer 1 in the present mode for carrying out the invention, any misalignment between the optical paths of transmitted light and reflected light from the optical filter 9 and the optical axes of the optical fibers 5, 6 and 7 with a lens can be corrected by adjusting the thickness L3 of the optical element substrate 9b.

The thickness L3 of the optical element substrate 9b will now be obtained. Equation 10 can be changed to:

$$-(\tan\theta f - \tan\theta 3)L3 = (\tan\theta f - \tan\theta 1)L1 + (\tan\theta f - \tan\theta 2)L2 + (\tan\theta f - \tan\theta 4)L4$$

Therefore:

$$L3 = \{(\tan\theta f - \tan\theta 1)L1 + (\tan\theta f - \tan\theta 2)L2 + (\tan\theta f - \tan\theta 4)L4\}/(\tan\theta 3 - \tan\theta f) \quad \text{Equation 11}$$

As will be described later in connection with an optical multiplexer/demultiplexer 1 and a method of manufacturing the same according to Embodiment 1 in the first mode for carrying out the invention, the optical axis of the reflecting end (the optical fiber 7 with a lens) may be adjusted by moving the position of the thin film 9a in the direction of the width of the groove 3 (the direction of the X-axis). The adjustment of the optical axis through a movement of the optical filter 9 in the direction of the X-axis results in a change in the ratio of the distance L1 in the space in the groove 3 to the distance L4. Since the optical element substrate 9b is used by processing it in advance such that it has a predetermined thickness L3, Equation 11 may not be satisfied when reflected light is adjusted by moving the optical filter 9.

Under the circumstance, the groove 3 is filled with the same substance to make the refractive index n1 of the space or region (extending the distance L1) in the groove from the side surface of the groove 3 where the optical fiber 5 with a lens is exposed up to the thin film 9a equal to the refractive index n4 of the space or region (extending the distance L4) in the groove from the optical element substrate 9b up to the groove 3 where the optical fiber 6 with a lens is exposed. In this case, since the combined width of the regions extending the distances L1 and L4 remains unchanged even if the ratio between the spaces extending the distances L1 and L4 changes, Equation 11 is still satisfied even after the optical fiber 9 is moved in the direction of the X-axis. Thus, n1 equals n4, and θ1 equals θ4.

Equation 11 can therefore be changed as follows by substituting θ1=θ4 into the same to derive the thickness L3 of the optical element substrate 9b expressed by the below conditional expression.

$$L3 = [(\tan\theta f - \tan\theta 1)(L1+L4) + (\tan\theta f - \tan\theta 2) \times L2]/(\tan\theta 3 - \tan\theta f)$$

In the optical multiplexer/demultiplexer 1, the widths of the regions extending the distances L1 and L4 can be made substantially constant in advance by positioning the thin film 9a of the optical filter 9 in the groove 3 with high accuracy. The invention is therefore applicable to a case in which the regions extending the distances L1 and L4 are not filled with the same substance (or different in refractivity).

When the thin film 9a is provided in a position where light from the optical fiber 5 with a lens is reflected, the light beam can be coupled to the optical fiber 7 with a lens. Therefore, referring to the orientation of the thin film 9a and the optical element substrate 9b in disposing the optical filter 9 in the groove 3, in addition to the configuration shown in FIGS. 1 and 4 in which a light beam from the optical fiber 5 with a lens is reflected by the thin film 9a after passing through the region extending the distance L1, an optical multiplexer/demultiplexer 1 satisfactorily works with a configuration in which light is reflected by the thin film 9a after passing through the region extending the distance L1 and the optical element substrate 9b (the positions of the thin film 9a and the optical element substrate 9b of the optical filter 9 relative to the light entering/exiting end face of the optical fiber 5 with a lens are the reverse of those in the optical multiplexer/demultiplexer 1 shown in FIGS. 1 and 4).

(Embodiment 1)

An embodiment of the invention will now be specifically described. In the present embodiment, silica optical fibers having a clad diameter of 125 μm and a mode field diameter of about 9 μm are used as single-mode optical fibers 5a to 7a. Optical fibers 5 to 7 with a lens are used, which are obtained by combining GI fibers 5b to 7b having an outer diameter of 125 μm, a core diameter of 105 μm, an axial refractive index n0 of 1.45, a specific refractive index difference Δ of 0.85% and a length of 800 μm with the single-mode optical fibers 5a to 7a having the same diameter. At this time, the distance "d" in the air is about 548 μm.

For example, the optical fibers with a lens have an axial refractive index n0 of 1.45, and silicon resin is used to satisfy n1=n4=1.41. An optical element substrate 9b has a refractive index n3 of 1.5, and a thin film 9a has an effective refractive index n2 of 1.6. The distances L1, L2 and L4 are 758 μm, 10 μm and 94 μm, respectively. End faces of the optical fibers 5 to 7 with a lens have an angle θf of 13.6°, so that an angle of 27.2° is defined between the optical fibers 5 and 7 with a lens. When the end face angle θf is 13.6°, spaces filled with the silicon resin have a refracting angle θ1=θ4=13.99°; the thin film 9a has a refracting angle θ2 of 12.30°; and the optical element substrate 9b has a refracting angle θ3 of 13.14°.

The thin film 9a is constituted by a dielectric multi-layer film which has the property of transmitting a beam having a wavelength in the range from 1300 nm to 1500 nm and blocking a beam having a wavelength in the range from 1540 nm to 1620 nm when light impinges upon the film at an angle of about 14°.

When the value L1 or the like are set as described above, L3=700 μm from the above-described equation to derive L3. When the thickness of the optical element substrate 9b is set at about 700 μm accordingly, a deviation of transmitted light from an optical axis becomes substantially 0 μm. Specifically, the light will not be misaligned with the optical axis of the optical fiber 6 with a lens in this state, and coupling loss at the end face of the optical fiber 6 with a lens can be reduced.

In the present mode for carrying out the invention, the light having a wavelength in the range from 1300 nm to 1500 nm is transmitted by the thin film 9a, and the light enters the optical fiber 6 with a lens after being further transmitted by the optical element substrate 9b. The light having a wavelength in the range from 1540 nm to 1620 nm is reflected by the thin film 9a to enter the optical fiber 7 with a lens. A single beam of light is thus demultiplexed into a plurality of beams of light.

At this time, the quantity of the light entering the optical fiber 7 with a lens among the reflected light from the thin film 9a can be adjusted by moving the optical element substrate 9b in the direction of the width of the groove 3. The quantity of the reflected light entering the optical fiber 7 with a lens is maximized when the position of the beam waist of the light exiting the optical fiber 5 with a lens coincides with the position of the thin film 9a and when the optical axis of the optical fiber 5 with a lens and the optical axis of the optical fiber 7 with a lens are aligned with each other. The GI fibers 5b and 7b are designed such that the beam waist will be positioned at the thin film 9a when the position of the thin film 9a is adjusted to achieve alignment between the optical axis of the optical fiber 5 with a lens and the optical axis of the optical fiber 7 with a lens. Therefore, when the thickness L3 is chosen to satisfy the above-described condition, transmitted light and reflected light can be optimized only by adjusting the position of the thin film 9a.

(Embodiment 2)

Another embodiment will now be specifically described. In the present embodiment, rod lenses forming a beam waist at a distance of 4658 μm from an end thereof in the air (whose refractive index is 1) were used as graded index lenses instead of GI fibers. Capillaries having an outer diameter φ of 1.0 mm were bonded to single-mode optical fibers 5a to 5c, and the fibers were polished to secure rod lenses having an outer diameter φ of 1.0 mm on the ends thereof and were disposed in V-shaped grooves 4. The rod lenses were configured so as to have a refractive index profile constant of $A^{1/2}$=0.596 and a final lens length of 3 mm.

The optical fibers with a lens have an axial refractive index n0 of 1.59, and epoxy resin is used to satisfy n1=n4=1.62. A ceramic glass substrate is used as an optical element substrate 9b to achieve a refractive index n3 of 1.53, and a thin film 9a has an effective refractive index n2 of 1.6. The distances L1, L2 and L4 are 7343 μm, 10 μm, and 2445 μm, respectively.

When the value L1 or the like are set as described above, L3=4600 μm from the above-described equation to derive L3. When the thickness of the optical element substrate 9b is set at 4600 μm accordingly, a deviation of transmitted light from an optical axis becomes substantially 0 μm. Specifically, the light will not be misaligned with the optical axis of an optical fiber 6 with a lens in this state, and any coupling loss at an end face of the optical fiber 6 with a lens can be reduced.

In the present embodiment, the amount of a misalignment from an optical axis is expressed by Equation 12 shown below.

$$\text{Amount of misalignment} \cong 0.015 \times \Delta L3 \quad \text{Equation 12}$$

where ΔL3 represents the amount of a deviation from the thickness L3 which results in a "0" optical misalignment.

As described above, light transmitted by the thin film 9a can be made to enter the optical fiber 6 with a lens for transmitted light beams with a small amount of optical misalignment by adjusting the thickness L3 of the optical element substrate 9b without aligning the optical fiber with a lens. Light reflected by the thin film 9a can be made to enter an optical fiber 7 with a lens for reflected light beams with a small amount of optical misalignment by moving the optical element substrate 9b in the direction of the width of the groove 3 (X-direction). It is therefore possible to optimize transmitted light and reflected light only by adjusting the thickness L3 and the position of the thin film 9a.

While the optical multiplexer/demultiplexer 1 in the present mode for carrying out the invention is used as an optical demultiplexer, it may alternatively be used as an optical multiplexer. In such a case, the optical fibers 6 and 7 with a lens are used as optical fibers for exiting light beams. Light (having a wavelength in the range from 1300 nm to 1500 nm) which has exited the optical fiber 6 with a lens enters the optical fiber 5 with a lens after being transmitted by the thin film 9a. Light (having a wavelength in the range from 1540 to 1620 nm) which has exited the optical fiber 7 with a lens enters the optical fiber 5 with a lens after being reflected by the thin film 9a. Thus, the two beams of light having different wavelengths are multiplexed into a single beam of light.

While a dielectric multi-layer film is used as the thin film 9a to demultiplex beams of light having a multiplicity of wavelengths in the present mode for carrying out the invention, this is not limiting the invention. For example, a mirror or beam splitter may be used instead of the dielectric multi-layer film to demultiplex a single beam of light into a plurality of beams of light. Further, multi-mode optical fibers made of plastic or the like may be used instead of the silica single-mode optical fibers 5a to 7a.

(Method of Manufacture)

A method of manufacturing an optical multiplexer/demultiplexer 1 in the first mode for carrying out the invention will now be described with reference to FIGS. 5A to 5J. FIGS. 5A to 5J show the method of manufacturing the optical multiplexer/demultiplexer 1 in the first mode for carrying out the invention.

For example, as shown in the plan view of FIG. 5A, a rectangular substrate 2 having a width of about 10 mm and a length of about 38 mm is first prepared. Then, two V-shaped grooves 4 having a V-shaped cross section are formed over a length of about 19 mm near the center of the substrate 2. The two V-shaped grooves 4 intersect each other at an angle of about 27.2°. The V-shaped grooves 4 have a depth of about 0.18 mm and a width of about 0.21 mm on the surface of the substrate. The vertices of the grooves have an angle of about 60°.

Next, as shown in the plan view of FIG. 5B, a groove 3a having a width of about 1.3 mm and a depth of about 0.25 mm is formed by positioning a center around the intersection between the two V-shaped grooves 4 and cutting a desired position of the substrate 2 with the slicer. As a result of this process, the two V-shaped grooves 4 are divided by the groove 3a, and four V-shaped grooves 4 are consequently formed.

Next, optical fibers 5 to 7 with a lens which have been provided in advance by fusion-bonding GI fibers to ends of single-mode optical fibers and cutting them into a predetermined length are mounted in the V-shaped grooves 4 such that the end faces of the GI fibers face the groove 3a, as shown in the plan view of FIG. 5C.

An L-shaped substrate 11 having an L-shaped sectional configuration (a substrate constituted by two planar members orthogonal to each other) as shown in the sectional view of FIG. 5D is prepared, and the L-shaped substrate 11 is urged against the optical fibers 5 to 7 with a lens from above such that an end 11a of the L-shaped substrate 11 is fitted to the groove 3a as shown in the sectional view of FIG. 5E. In this state, the ends of the optical fibers 5 to 7 with a lens are abutted on side surfaces of the end 11a of the L-shaped substrate 11 (the optical fibers 5 to 7 with a lens are urged in the direction of the arrow in FIG. 5E). As a result, the positions of the ends of the optical fibers 5 to 7 with a lens and the positions of edges of the groove 3a coincide with each other. Thereafter, the optical fibers 5 to 7 with a lens, the L-shaped substrate 11 or the like are bonded and secured. As thus described, the optical fibers 5 to 7 with a lens are secured by urging the L-shaped substrate 11 against the optical fibers 5 to 7 with a lens from above. The L-shaped substrate 11 corresponds to the "block" according to the invention.

The above-described positioning and bonding step may be performed by inserting a member 12 such as a spacer in the groove 3a and mounting a flat plate made of glass or the like such that it is urged against the member 12 from above with the ends of the optical fibers 5 to 7 with a lens abutted on the member 12 such as a spacer as shown in FIG. 5I. Although there is no limitation on the material of the member 12 such as a spacer, the member 12 is preferably made of the same material as the substrate 2 or a material of high processability when it is mounted along with the flat plate. The member 12 such as a spacer is not required to have high processability when it can be removed after the positioning and bonding step.

Further, as shown in FIG. 5J, a wedge-shaped plate 13 may be inserted in the groove 3a, and the ends of the optical fibers 5 to 7 with a lens may be positioned by abutting them on the plate 13.

Next, as shown in the plan view of FIG. 5F, the substrate 2 is further cut with the slicer in the region thereof where the groove 3a is formed, thereby forming another groove 3 having a width of about 1.7 mm. As a result of this step, the end 11a of the L-shaped substrate 11 and the ends of the optical fibers 5 to 7 with a lens are also cut, and the end faces of the optical fibers 5 to 7 are cut at an angle along the groove 3 because the fibers are provided at an angle to the groove 3.

As shown in the plan view of FIG. 5G, an optical element securing plate 10 (with dimensions of 2×2×a thickness of 0.7 mm) is prepared, the plate having a width of about 10 mm and being formed with a groove 10a having a width of about 0.72 mm and a depth of about 0.65 mm in the middle thereof. As shown in the sectional view of FIG. 5H, an optical element substrate 9b having a thin film 9a constituted by a dielectric multi-layer film provided on a surface thereof is mounted and secured in the groove 10a of the optical element substrate securing plate 10 such that the surface of the thin film 9a will be perpendicular to the optical element substrate securing plate 10.

The optical-element substrate 9b is then inserted in the groove 3 formed on the substrate 2 to fabricate the optical multiplexer/demultiplexer 1 in the present mode for carrying out the invention. Since the width of the groove 3 is greater than the thickness of the optical element substrate 9b, the optical element substrate 9b can be freely moved in the direction of the width of the groove 3.

For example, an optical filter 9 that is constituted by the thin film 9a and the optical element substrate 9b is moved in the direction of the width of the groove 3 to adjust the optical path of light which exits the optical fiber 5 with a lens and which is reflected by the optical filter 9 to enter the optical fiber 7 with a lens, and the optical filter 9 is secured in a position where there is little optical misalignment.

As described above, when the groove for setting the optical filter is formed on the substrate, the ends of the optical fibers with a lens are simultaneously processed. Since it is therefore possible to manufacture an optical multiplexer/demultiplexer with a small number of steps, end face processing can be performed with high efficiency. Further, since the lengths of the optical fibers with a lens can be controlled when the groove is formed, it is possible to manufacture optical multiplexers/demultiplexers with optical systems of high reproducibility.

<Second Mode for Carrying Out the Invention>

A second mode for carrying out the invention will now be described with reference to FIGS. 6 to 7E.

(Configuration)

A configuration of an optical multiplexer/demultiplexer in the second mode for carrying out the invention will be described with reference to FIG. 6. FIG. 6 is a perspective view of the optical multiplexer/demultiplexer in the present mode for carrying out the invention showing a schematic configuration of the same.

Figure 6:
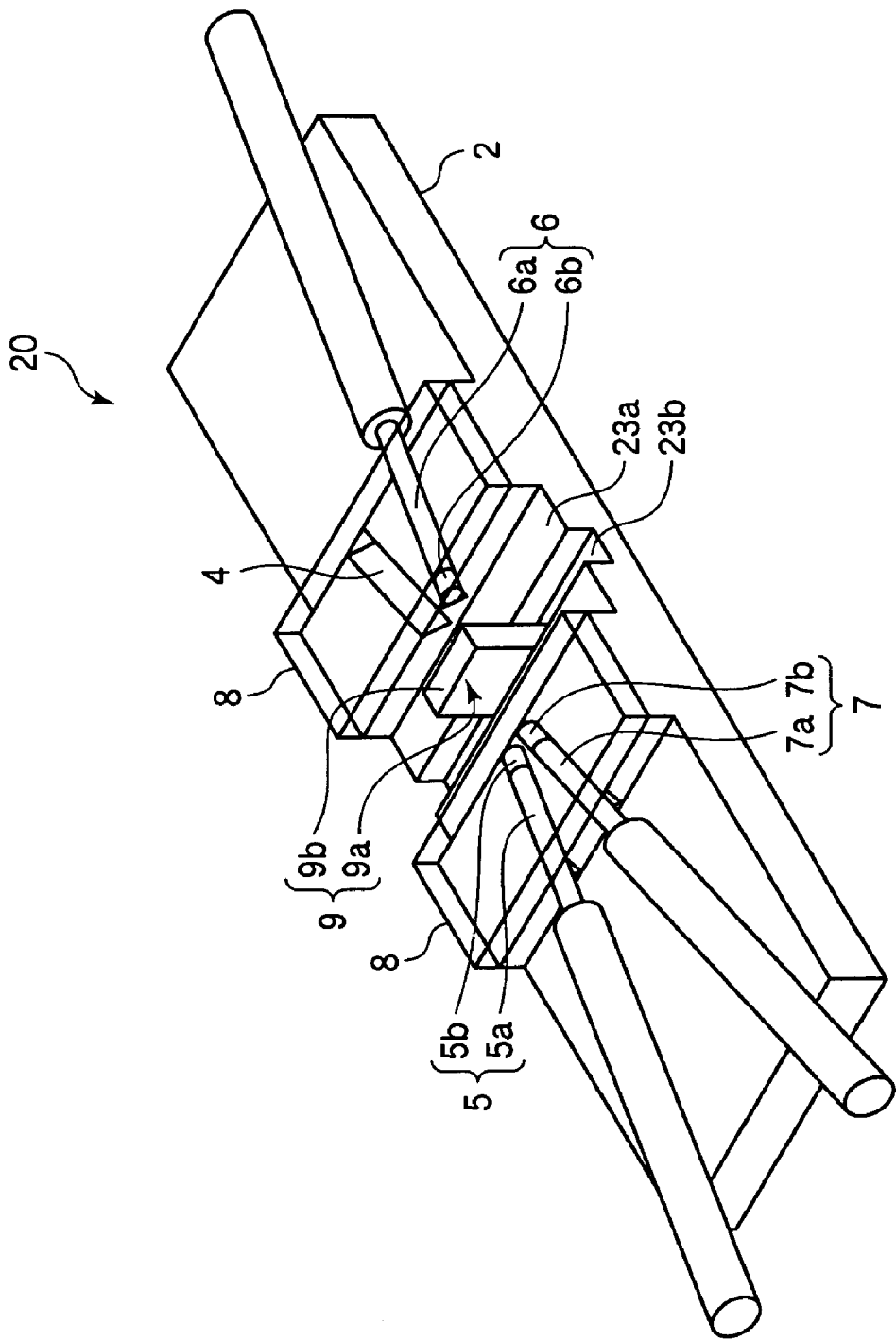
FIG. 6 is a perspective view of an optical multiplexer/demultiplexer in a second mode for carrying out the invention showing a schematic configuration thereof.

As shown in FIG. 6, an optical multiplexer/demultiplexer 20 in the present mode for carrying out the invention has substantially the same configuration as that of the optical multiplexer/demultiplexer 1 in the first mode for carrying out the invention, and it is characterized in that it has a different optical element substrate and employs a different configuration for a base groove in which the optical element substrate is mounted. The configuration of an optical element substrate and a base groove in which the optical element substrate is mounted will be described in detail. The configuration of the device is otherwise the same as the above-described configuration of the optical multiplexer/demultiplexer 1 and will not therefore be described.

As shown in FIG. 6, the optical multiplexer/demultiplexer 20 in the present mode for carrying out the invention is formed with a base groove 23 instead of the groove 3. The groove 23 comprises a groove 23a having a predetermined width and depth and another groove 23b formed within the groove 23a. An optical element substrate 9b having a thin film 9a formed on a surface thereof is mounted and secured in the groove 23b.

The same effects as those in the above-described first mode for carrying out the invention can be provided with the optical multiplexer/demultiplexer 20 having such a configuration. Specifically, when the thickness of the optical element substrate 9b satisfies the relationship expressed by the above-described equation for deriving L3, it is possible to reduce any deviation of transmitted light entering an optical fiber 6 with a lens from the optical axis of the optical fiber 6 with a lens.

The thickness L3 of the optical element substrate 9b is adjusted and the position of disposing the optical element substrate 9b is adjusted by adjusting the position of forming the groove 23b, it is possible to reduce any deviation of reflected light entering an optical fiber 7 with a lens from the optical axis.

Further, an optical misalignment can be adjusted by changing the refractive index of a substance with which the groove 23 is filled instead of adjusting the position of the optical element substrate 9b. Specifically, a plurality of substances having different refractive indices is prepared in advance, and an optical misalignment is adjusted by changing the substance with which the groove 23 is filled to provide a different refractive index in the groove 23.

In the optical multiplexer/demultiplexer 20 in the present mode for carrying out the invention, light can be demultiplexed using a mirror or beam splitter in the same way as in the first mode for carrying out the invention. The device can be also used as an optical multiplexer.

(Method of Manufacture)

A method of manufacturing an optical multiplexer/demultiplexer 20 in the second mode for carrying out the invention will now be described with reference to FIGS. 7A to 7E. FIGS. 7A to 7E show the method of manufacturing the optical multiplexer/demultiplexer in the second mode for carrying out the invention.

Figure 7A:
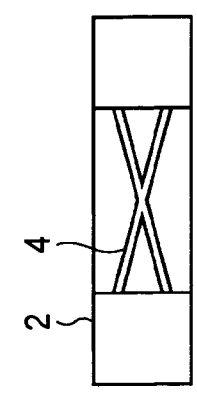
FIGS. 7A to 7E show a method of manufacturing an optical multiplexer/demultiplexer in the second mode for carrying out the invention.
Figure 7D:
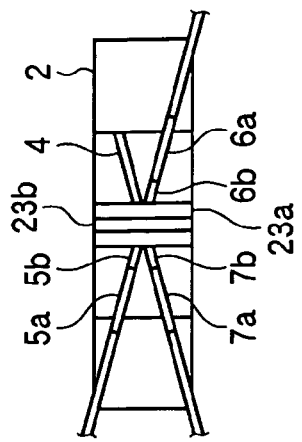

As shown in the plan view of FIG. 7A, a substrate 2 is prepared, and two V-shaped grooves 4 having a V-shaped sectional configuration are formed on the substrate 2. The V-shaped grooves 4 intersect each other at an angle of, for example, about 27.2° just as in the first mode for carrying out the invention. Although the V-shaped grooves 4 in the present mode for carrying out the invention are formed such that the two V-shaped grooves 4 extend across completely each other, the invention is not limited to such an arrangement. It is not essential that the grooves extend across each other, and what is required is to form the V-shaped grooves 4 such that either of the V-shaped grooves 4 is inclined relative to the other V-shaped groove 4 at a predetermined angle which is about 27.2° in the present mode for carrying out the invention.

Figure 7B:
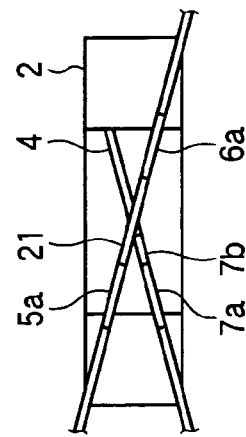
Figure 7E:
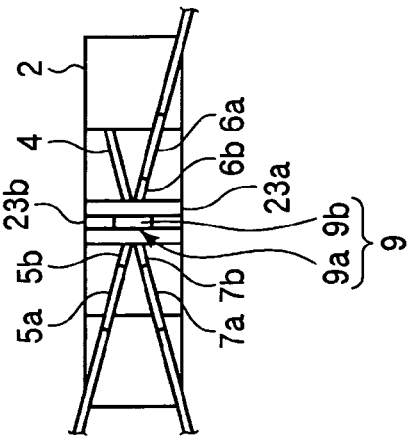

Next, as shown in the plan view of FIG. 7B, an optical fiber with a lens, which is constituted by single-mode optical fibers 5a and 6a fusion-bonded to both ends of a GI fiber 21, is disposed in either of the V-shaped grooves 4, and another optical fiber with a lens obtained by fusion-bonding a GI fiber 7b to one end of a single-mode optical fiber 7a is disposed in the other V-shaped groove 4. At this time, the optical fibers with a lens are disposed such that the position of the connection between single-mode optical fiber 5a and the GI fiber 21 coincides with the position of the connection between the single-mode optical fiber 7a and the GI fiber 7b. Then, the optical fibers with a lens are urged from above with a presser plate (not shown) and secured to the substrate 2 using a bonding agent.

Figure 7C:
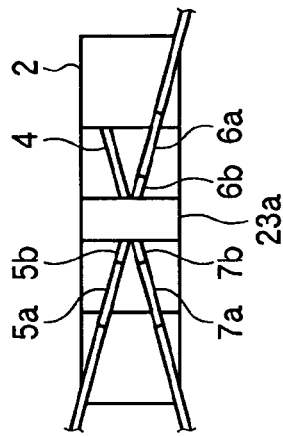

Next, as shown in the plan view of FIG. 7C, the substrate 2 is cut using a slicer to form a groove 23a thereon. At this time, an intermediate section of the GI fiber 21 and the end of the GI fiber 7b are simultaneously cut to form optical fibers 5 to 7 with a lens. The optical fibers with a lens are processed such that their GI fibers become equal in length. When the groove 23a is formed in such a manner, the positions of the ends of the optical fibers 5 to 7 with a lens and the positions of edges of the groove 23a coincide, and the end faces of the optical fibers 5 to 7 with a lens are formed at an angle.

As shown in the plan view of FIG. 7D, a part of the groove 23a is further cut by operating the slicer along the groove 23a to form a groove 23b. Since the groove 23b is a groove in which an optical element substrate 9b is to be disposed, the groove 23b is formed in the position in which the optical element substrate 9b is to be disposed. As shown in the plan view of FIG. 7E, the optical element substrate 9b which is formed with a thin film 9a on a surface thereof is mounted and secured in the groove 23b to fabricate an optical multiplexer/demultiplexer 20 in the present mode for carrying out the invention.

As described above, since the ends of the optical fibers with a lens are processed at the same time when the groove for disposing the optical element substrate is formed on the substrate, the optical multiplexer/demultiplexer can be manufactured with a small number of steps, and it is therefore possible to process the end faces with high efficiency. Further, since the length of the optical fibers with a lens can be controlled when the groove is formed, it is possible to manufacture optical multiplexers/demultiplexers with optical systems of high reproducibility.

<Third Mode for Carrying Out the Invention>

An optical multiplexer/demultiplexer and a method of manufacturing the same in a third mode for carrying out the invention will now be described with reference to FIGS. 8 to 13C. An optical multiplexer/demultiplexer 30 in the present mode for carrying out the invention is characterized in that the angle of a light entering surface of an optical filter 9 can be easily adjusted before the optical filter 9 is secured to a substrate 2. As a result, in the optical multiplexer/demultiplexer 30, light which has exited an optical fiber 5 with a lens and which has been reflected by the optical filter 9 can be properly coupled to an optical fiber 7 with a lens.

Figure 9A:
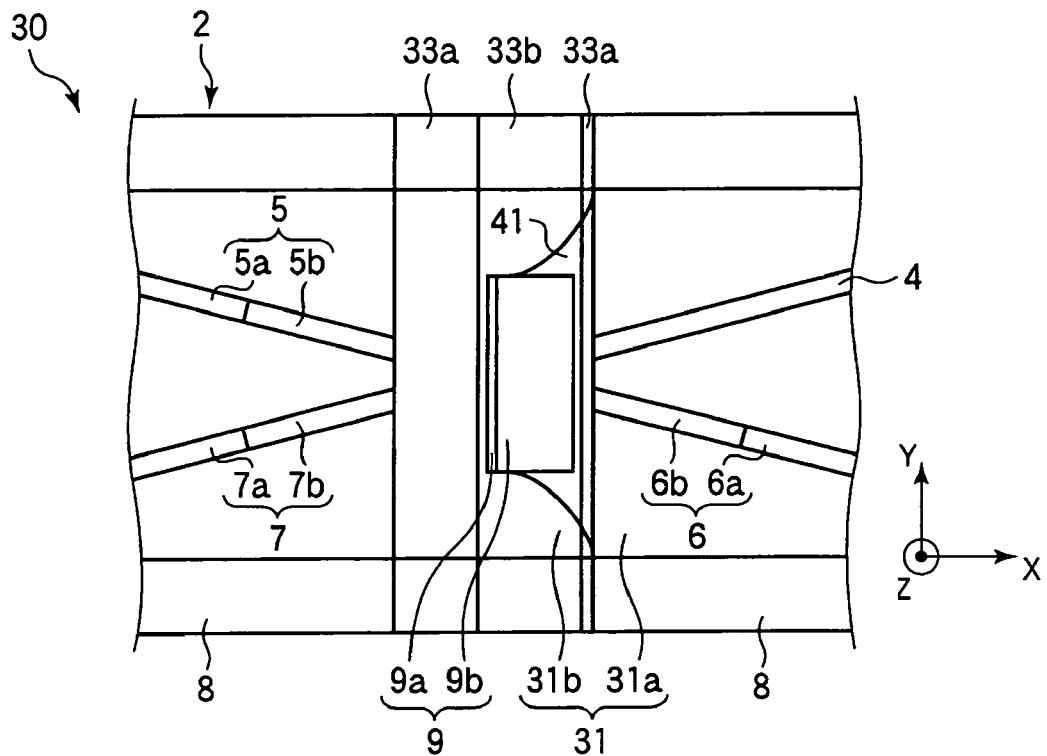
FIGS. 9A and 9B show a schematic configuration of the neighborhood of an optical filter of the optical multiplexer/demultiplexer in the third mode for carrying out the invention.
Figure 9B:
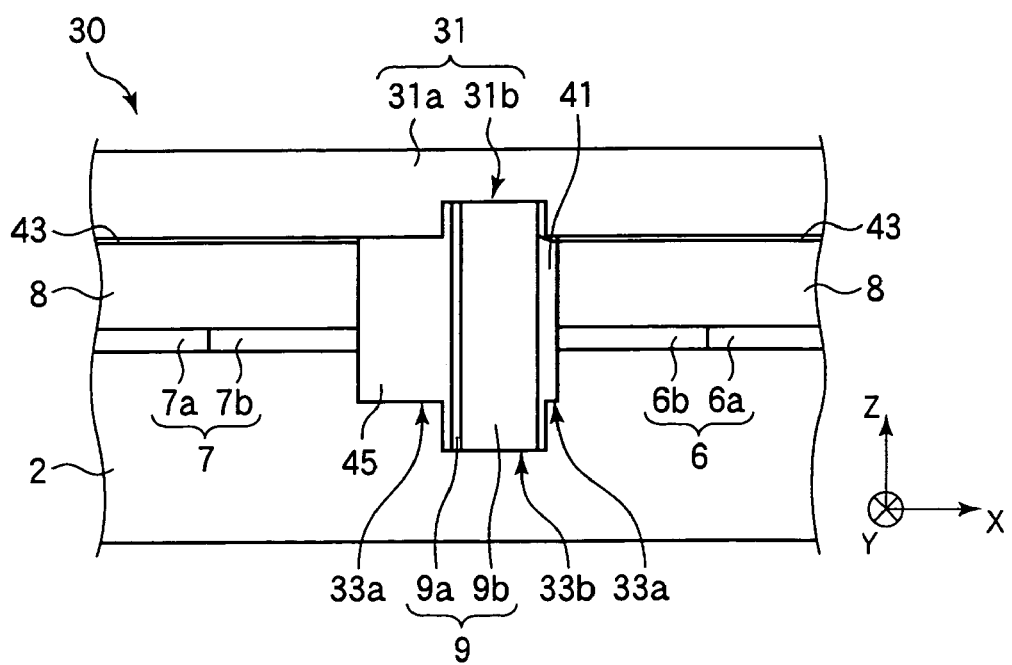

A schematic configuration of the optical multiplexer/demultiplexer 30 in the present mode for carrying out the invention will now be described with reference to FIGS. 8 to 9B. FIG. 8 is a perspective view of the optical multiplexer/demultiplexer 30 showing a schematic configuration of the same. For easier understanding of the configuration of the optical multiplexer/demultiplexer 30, FIG. 8 shows a state in which an inclination adjusting member 31 has been removed from optical fiber securing plates 8. Further, FIG. 8 shows a part of the neighborhood of the optical filter 9 on a non-see-through basis. The XYZ coordinate system shown in FIG. 8 has the X-axis in a direction in which light is transmitted by the optical filter 9, the Y-axis in a direction extending across the transmitting direction in an orthogonal relationship with the X-axis, and the Z-axis in a direction extending orthogonally to a plane including optical fibers 5, 6 and 7 with a lens in an orthogonal relationship with each of the X-axis and Y-axis. FIG. 9A is a view of the neighborhood of the optical filter 9 of the optical multiplexer/demultiplexer 30 taken in the direction of the Z-axis shown in FIG. 8. FIG. 9B is a view of the neighborhood of the optical filter 9 of the optical multiplexer/demultiplexer 30 taken in the direction of the Y-axis shown in FIG. 8.

As shown in FIG. 8 to 9B, the optical multiplexer/demultiplexer 30 in the present mode for carrying out the invention has a base groove 33a formed in the direction of the Y axis in the figures substantially across a central part of the substrate 2 similarly to that of the optical multiplexer/demultiplexer 20 in the second mode for carrying out the invention. The groove 33a includes a setting groove 33b which is formed on the bottom face of the groove 33a and in which the optical filter 9 is set. The setting groove 33b is formed in the same direction as the groove 33a. The width of the setting groove 33b (the length in the direction of the X-axis in the figures) is slightly greater than the thickness of the optical filter 9 so that the angle of the optical filter 9 set in the setting groove 33b can be adjusted.

The optical multiplexer/demultiplexer 30 has an inclination adjusting member 31 instead of the optical element substrate securing plate 10 of the optical multiplexer/demultiplexer 1 in the first mode for carrying out the invention. For example, the inclination adjusting member 31 is formed of tempax glass in the form of a thin rectangular parallelepiped. The inclination adjusting member 31 has a flat plate member 31a which is in contact with the optical filter 9. The flat plate member 31a has a contact groove 31b which is formed in the region thereof in contact with the optical filter 9 such that it extends in the direction of the Y-axis in the figures. The contact groove 31b is formed with a width (length in the direction of the X-axis in the figures) slightly greater than the thickness of the optical filter 9. The contact groove 31b is formed with a predetermined depth (a length in the direction of the Z-axis in the figures) such that the top surface of the optical filter 9 contacts the bottom surface of the contact groove 31*b* when the inclination adjusting member 31 is placed across the groove 33*a* (see FIG. 9B).

As shown in FIGS. 9A and 9B, the optical filter 9 is secured to a side surface of the groove 33*a* on which a light entering/exiting end face of an optical fiber 6 with a lens is exposed using an ultraviolet-set resin 41 having a predetermined refractive index. The inclination adjusting member 31 is secured to the optical fiber securing plates 8 with a thermoset resin 43. When the inclination adjusting member 31 is secured to the optical fiber securing plates 8, the optical filter 9 is securely set in the groove 33*a* using the contact groove 31*b* and the setting groove 33*b*. The gap between the side surface of the groove 33*a* where a light entering/exiting end face of the optical fiber 5 with a lens is exposed and the optical filter 9 is filled with a thermoset resin 45 (e.g., silicon gel) having a predetermined refractive index.

The optical multiplexer/demultiplexer 30 provides the same effects as those in the first and second modes for carrying out the invention. When the thickness L3 of the optical element substrate 9*b* satisfies the above-described conditional expression, substantially no misalignment occurs between the optical path of transmitted light entering the optical fiber 6 with a lens after exiting the optical fiber 5 with a lens and being transmitted by the optical filter 9 and the optical axes of the optical fibers 5 and 6 with a lens.

The thickness L3 of the optical element substrate 9*b* is adjust and the position of disposing the optical filter 9 by adjusting the position of forming the groove 33*b*, it is possible to make almost no misalignment between the optical path of the reflected light which exits the optical fiber 5 with a lens, is reflected by the optical filter 9, and enters the optical fiber 7 with a lens and the optical axes of the optical fibers 5 and 7 with a lens.

Further, by changing the refractive indices of the resins 41 and 45 with which the grooves 33*a* and 33*b* are filled instead of adjusting the position of the optical filter 9, it is possible to adjust any misalignment between the optical axes of the optical fibers 5 and 6 with a lens and the optical path of transmitted light from the optical filter 9 and any misalignment between the optical axes of the optical fibers 5 and 7 with a lens and the optical path of reflected light from the optical filter 9.

Furthermore, in the optical multiplexer/demultiplexer 30 in the present mode for carrying out the invention, light reflected by the optical filter 9 after exiting the optical fiber 5 with a lens can be properly coupled to the optical fiber 7 with a lens by adjusting the angle of the light entering surface of the optical filter 9. A description will now be made with reference to FIGS. 10A to 11B on method of adjusting the inclination of the optical filter 9 such that light which has exited the optical fiber 5 with a lens is coupled to the optical fiber 7 with a lens. FIGS. 10A to 11B are views of the neighborhood of the optical filter 9 of the optical multiplexer/demultiplexer 30 taken in the direction of the Y-axis shown in FIG. 8.

Figure 10A:
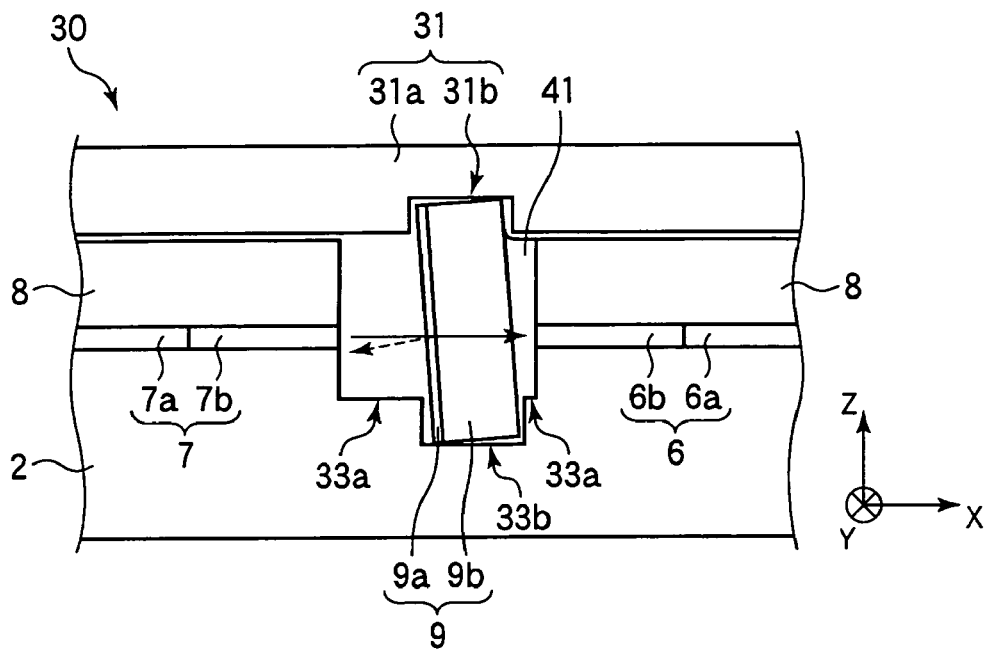
FIGS. 10A and 10B show a method of adjusting the angle of the optical filter of the optical multiplexer/demultiplexer in the third mode for carrying out the invention.

When light which has exited the optical filter 5 with a lens (not shown in FIGS. 10A and 10B) enters the optical filter 9 perpendicularly thereto in a view in the direction of the Y-axis, transmitted light from the optical filter 9 is properly coupled to the optical fiber 6 with a lens, and reflected light is properly coupled to the optical fiber 7 with a lens. As shown in FIG. 10A, when the optical filter 9 is set in the setting groove 33*b* at an inclination, the exit light does not perpendicularly impinge upon the light entering surface of the optical filter 9 when viewed in the direction of the Y-axis. As a result, the transmitted light that is indicated by the solid line in the figure is misaligned with the optical axis of the optical fiber 6 with a lens, and the reflected light that is indicated by broken line in the figure is misaligned with the optical axis of the optical fiber 7 with a lens.

The amount of the misalignment between the optical axis of the optical fiber 6 with a lens and the optical path of the transmitted light from the optical filter 9 is determined by an angular misalignment and a positional misalignment between the light exiting the optical fiber 5 with a lens and the light entering surface of the optical filter 9. In particular, the angular misalignment contributes to the misalignment of the optical path of the transmitted light more significantly than the positional misalignment. The angular misalignment of the transmitted light is a deviation from a design value of the angle of incidence of light exiting the optical fiber 5 with a lens upon the light entering surface. Therefore, the amount of the misalignment between the optical axis of the optical fiber 6 with a lens and the optical path of the transmitted light from the optical filter 9 is relatively small, and the transmitted light can be coupled to the optical fiber 6.

The amount of the misalignment between the optical axis of the optical fiber 7 with a lens and the optical path of the reflected light from the optical filter 9 is also determined by an angular misalignment and a positional misalignment between the light exiting the optical fiber 5 with a lens and the light entering surface of the optical filter 9. The angular misalignment of the reflected light is twice a deviation from a design value of the angle of incidence of light exiting the optical fiber 5 with a lens upon the light entering surface. Therefore, the reflected light can hardly be coupled to the optical fiber 7. A description will now be made on a method of adjusting any misalignment between the optical path of reflected light and the optical axis by adjusting the inclination of the optical filter 9.

Figure 10B:
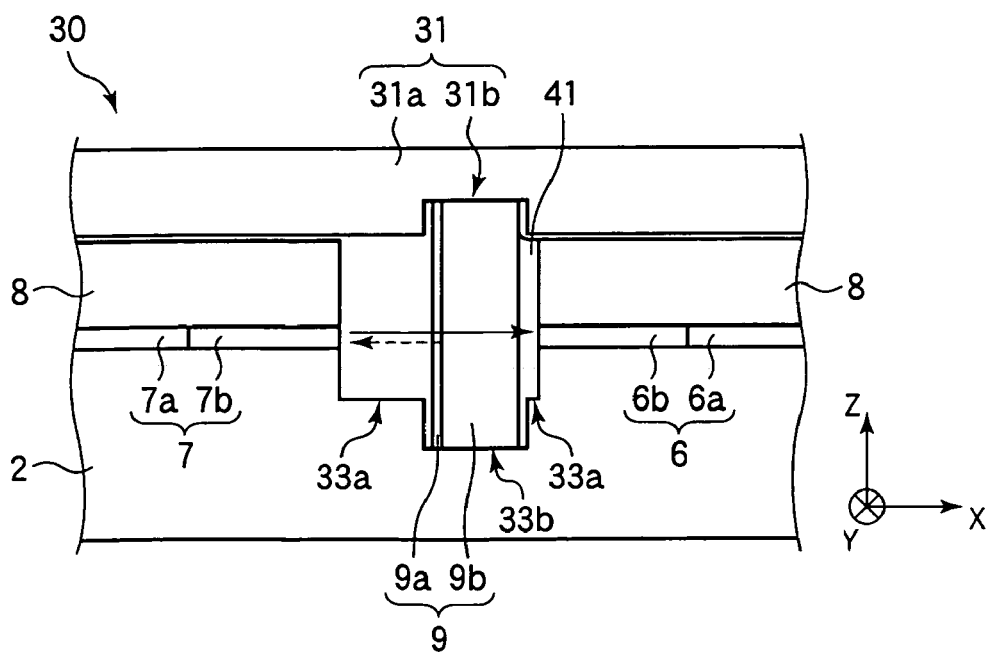

First, as shown in FIG. 10A, the gap between the optical element substrate 9*b* and the side surface of the groove 33*a* on which the light entering/exiting end face of the optical fiber 6 with a lens is exposed is filled with the resin 41. Next, the inclination adjusting member 31 is disposed on the optical fiber securing plates 8 such that at least a part of the top surface of the optical filter 9 contacts the bottom surface of the contact groove 31*b* of the flat plate member 31*a*. Next, light is made to enter the optical fiber 5 with a lens. Next, as shown in FIG. 10B, the flat plate member 31*a* of the inclination adjusting member 31 is shifted in the positive (+) direction (to the right in the figure) along the X-axis in the figure while measuring the quantity of light which has exited the optical fiber 5 with a lens and which has been reflected by the optical filter 9 at the other end of the single-mode optical fiber 7*a* (not shown).

A corner section on the top surface of the optical filter 9 is in contact with the bottom surface of the contact groove 31*b*. Therefore, when the flat plate member 31*a* is shifted in the positive direction along the X-axis in the figure, a frictional force generated between the corner section of the top surface of the optical filter 9 and the bottom surface of the contact groove 31*b* causes the optical filter 9 to rotate clockwise with respect to the Y-axis in the figure, the fulcrum of the rotation being the corner section of the filter which is on the side thereof where the thin film 9*a* is formed and which is in contact with the setting groove 33*b*. As a result, the angle of the light entering surface of the optical filter 9 is adjusted relative to the plane including the optical fibers 5 and 7 with a lens.

When the angle of the light entering surface of the optical filter 9 is adjusted by shifting the flat plate member 31*a* of the inclination adjusting member 31 as thus described, a change also occurs in the amount of any misalignment between the optical axes of the optical fibers 5 and 7 with a lens and the optical path of reflected light from the optical filter 9. Accordingly, the quantity of reflected light which exits the other end of the single-mode optical fiber 7a also changes. When the light entering surface of the optical filter 9 viewed in the direction of the Y-axis is orthogonal to the optical axis of the optical fiber 5 with a lens, exiting light impinges upon the light entering surface perpendicularly thereto. Since this minimizes the amount of any misalignment between the optical axis of the optical fiber 7 with a lens and the reflected light from the optical filter 9, the quantity of the reflected light exiting the other end of the single-mode optical fiber 7a is maximized. It will be understood that the angle of the optical filter 9 has been adjusted to an optimum condition. Next, the resin 41 is set by irradiating it with ultraviolet light in this state. The light entering surface of the optical filter 9 is thus secured at an angle that is optimal for the plane including the optical fibers 5 and 7 with a lens.

Figure 11A:
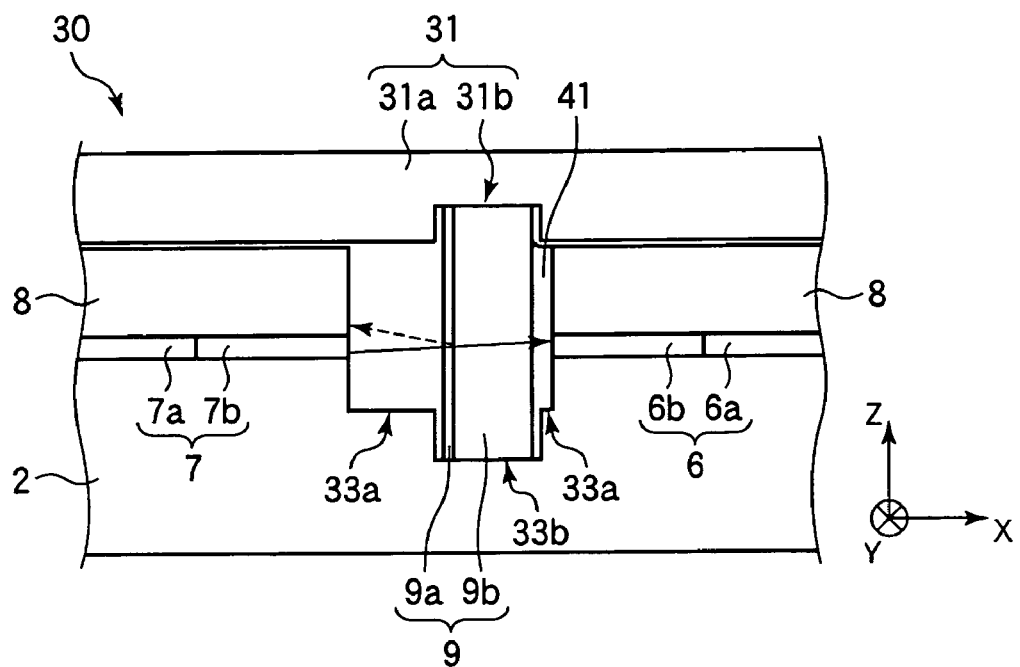
FIGS. 11A and 11B show another method of adjusting the angle of the optical filter of the optical multiplexer/demultiplexer in the third mode for carrying out the invention.
Figure 11B:
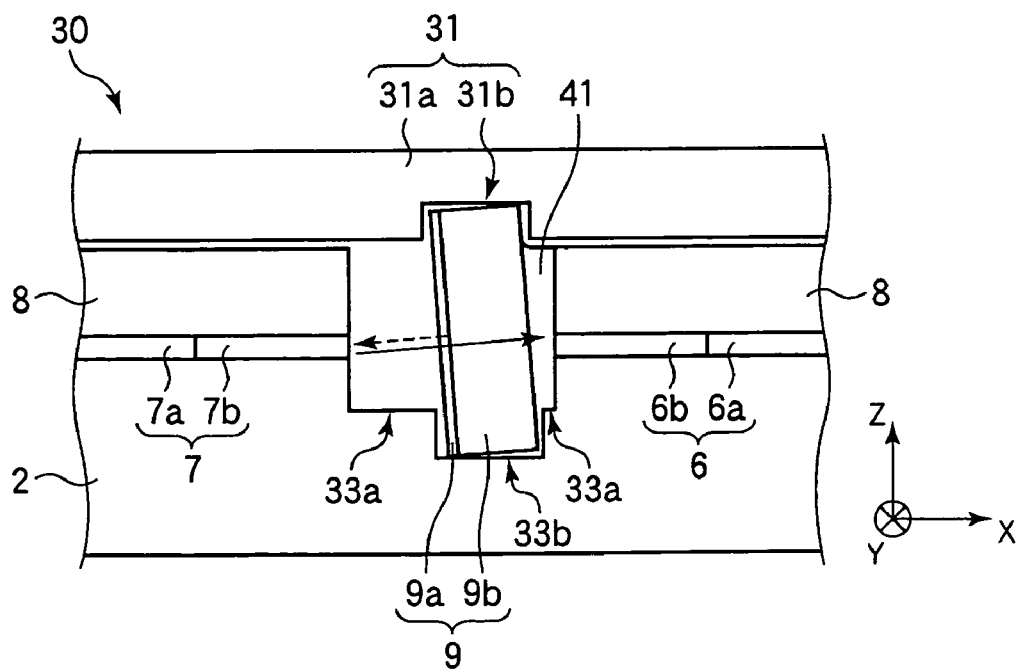

FIGS. 11A and 11B show a method of adjusting any misalignment between the optical path of reflected light from the optical filter 9 and the optical axes of the optical fibers 5 and 7 with a lens caused by an angular misalignment of a light exit angle of the optical fiber 5 with a lens (not shown in FIGS. 11A and 11B). In general, an optical fiber with a lens is formed by connecting a single-mode optical fiber and a GI fiber using fusion-bonding. Therefore, eccentricity can occur between the optical axis of the single-mode optical fiber and the optical axis of the GI fiber. In such a case, light exits the optical fiber with a lens at an exit angle that is different from a design value.

When the optical axis of the optical fiber 5 with a lens becomes eccentric, as shown in FIG. 11A, light which has exited the optical fiber 5 with a lens will not impinge upon the light entering surface of the optical filter 9 perpendicularly there to when viewed in the direction of the Y-axis. Therefore, transmitted light indicated by the solid line in the figure is misaligned with the optical axes of the optical fibers 5 and 6 with a lens, and reflected light indicated by the broken line in the figure is misaligned with the optical axes of the optical fibers 5 and 7 with a lens. As described above, the amount of the misalignment between the optical axis of the optical fiber 6 with a lens and the optical path of the transmitted light from the optical filter 9 is determined by an angular misalignment and a positional misalignment between the light exiting the optical fiber 5 with a lens and the light entering surface of the optical filter 9. The angular misalignment of the transmitted light is a deviation from a design value of the angle of incidence of the light exiting the optical fiber 5 with a lens upon the light entering surface. Therefore, the amount of the misalignment between the optical axis of the optical fiber 6 with a lens and the optical path of the transmitted light from the optical filter 9 is relatively small, and the transmitted light can be coupled to the optical fiber 6.

The amount of the misalignment between the optical axis of the optical fiber 7 with a lens and the optical path of the reflected light from the optical filter 9 is also determined by an angular misalignment and a positional misalignment between the light exiting the optical fiber 5 with a lens and the light entering surface of the optical filter 9. The angular misalignment of the reflected light is twice a deviation from a design value of the angle of incidence of light exiting the optical fiber 5 with a lens upon the light entering surface. Therefore, the reflected light can hardly be coupled to the optical fiber 7. A description will now be made on a method of adjusting any misalignment between the optical path of reflected light and the optical axis by adjusting the inclination of the optical filter 9.

First, as shown in FIG. 11A, the gap between the optical element substrate 9b and the side surface of the groove 33a on which the light entering/exiting end face of the optical fiber 6 with a lens is exposed is filled with the resin 41. Next, the inclination adjusting member 31 is disposed on the optical fiber securing plates 8 such that the top surface of the optical filter 9 contacts the bottom surface of the contact groove 31b of the flat plate member 31a. Next, light is made to enter the optical fiber 5 with a lens. Next, as shown in FIG. 1B, the flat plate member 31a of the inclination adjusting member 31 is shifted in the negative (−) direction (to the left in the figure) along the X-axis in the figure while measuring the quantity of light which has exited the optical fiber 5 with a lens and which has been reflected by the optical filter 9 at the other end of the single-mode optical fiber 7a (not shown).

The top surface of the optical filter 9 is in contact with the bottom surface of the contact groove 31b. Therefore, when the flat plate member 31a is shifted in the negative direction along the X-axis in the figure, a frictional force generated between the top surface of the optical filter 9 and the bottom surface of the contact groove 31b causes the optical filter 9 to rotate counterclockwise with respect to the Y-axis in the figure, the fulcrum of the rotation being the corner section of the filter which is on the side thereof where the thin film 9a is formed and which is in contact with the setting groove 33b. As a result, the angle of the light entering surface of the optical filter 9 is adjusted relative to the plane including the optical fibers 5 and 7 with a lens.

When the angle of the light entering surface of the optical filter 9 is adjusted by shifting the flat plate member 31a of the inclination adjusting member 31 as thus described, the exiting light impinges upon the optical filter 9 substantially perpendicularly thereto, and the quantity of the reflected light exiting the other end of the single-mode optical fiber 7a is maximized. It will be understood that the angle of the optical filter 9 has been adjusted to an optimum condition. Next, the resin 41 is set by irradiating it with ultraviolet light in this state. The light entering surface of the optical filter 9 is thus secured at an angle that is optimal for the plane including the optical fibers 5 and 7 with a lens.

Figure 12:
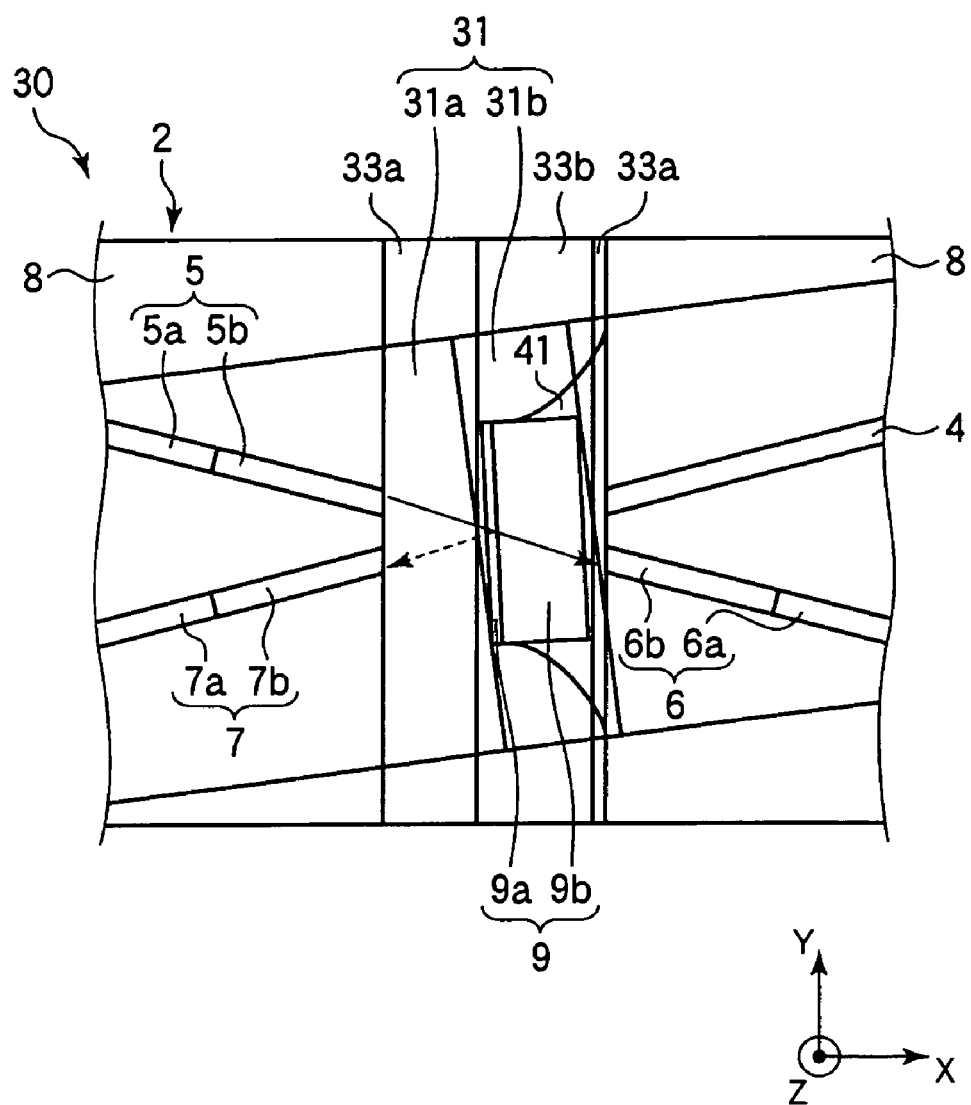
FIG. 12 shows another method of adjusting the angle of the optical filter of the optical multiplexer/demultiplexer in the third mode for carrying out the invention.

A description will now be made with reference to FIG. 12 on the disposition of the optical filter 9 and an adjustment of the angle of the light entering surface of the optical filter 9 to be performed when the exit angle of light exiting the optical fiber 5 with a lens is inclined about the Z-axis. FIG. 12 is a view of the neighborhood of the optical filter 9 of the optical multiplexer/demultiplexer 30 taken in the direction of the Z-axis as shown in FIG. 8. When the exit angle of light exiting the optical fiber 5 with a lens is shafted about the Z-axis relative to a design value because of eccentricity of the optical axis of the fiber, reflected light from the optical filter 9 will hardly be coupled to the optical filter 7 with a lens. In such a case, as shown in FIG. 12, the flat plate member 31a of the inclination adjusting member 31 can be shifted by rotating it about the Z-axis to adjust the angle of the light entering surface of the optical filter 9.

For example, when the flat plate member 31a is shifted from the state shown in FIG. 9A by rotating it counterclockwise with respect to the Z-axis, one side surface of the contact groove 31b (the side surface on the left in FIG. 12) contacts the lower corner section of the thin film 9a of the optical filter 9 in the figure, and the other side surface of the contact groove 31b (the side surface on the right in FIG. 12)

contacts the upper corner section of the optical element substrate 9*b* in the figure. When the flat plate member 31*a* is further shifted by rotating it in the same direction, the corner section of the thin film 9*a* receives a force in the positive direction along the X-axis from the one side surface of the contact groove 31*b*, and the corner section of the optical element substrate 9*b* receives a force in the negative direction along the X-axis from the other side surface of the contact groove 31*b*. The forces received by the corner section of the thin film 9*a* and the corner section of the optical element substrate 9*b* are substantially equal in magnitude and are oppositely directed.

Therefore, as shown in FIG. 12, the optical filter 9 rotates counterclockwise with respect to the Z-axis, the center of the optical filter 9 substantially serving as the axis of rotation. As a result, the light which has exited the optical fiber 5 with a lens impinges upon the optical filter 9 at a predetermined angle when viewed in the direction of the Z-axis, and the resultant reflected light from the optical filter 9 indicated by the broken line in the figure can be coupled to the optical fiber 7 with a lens. Since the angle of the light entering surface of the optical filter 9 can be adjusted as thus described, reflected light from the optical filter 9 can be properly coupled to the optical filter 7 with a lens.

The inclination of the optical fiber 9 can be adjusted in rotating with respect to the Y-axis and the Z-axis at the same time by the inclination adjusting member 31.

As described above, by adjusting the angle of the optical filter 9 using the inclination adjusting member 31 including the flat plate member 31*a* formed with the contact groove 31*b*, any misalignment between the optical path of reflected light from the optical filter 9 and the optical axes of the optical fibers 5 and 7 with a lens can be adjusted to couple the reflected light to the optical fiber 7 with a lens properly.

Figure 13A:
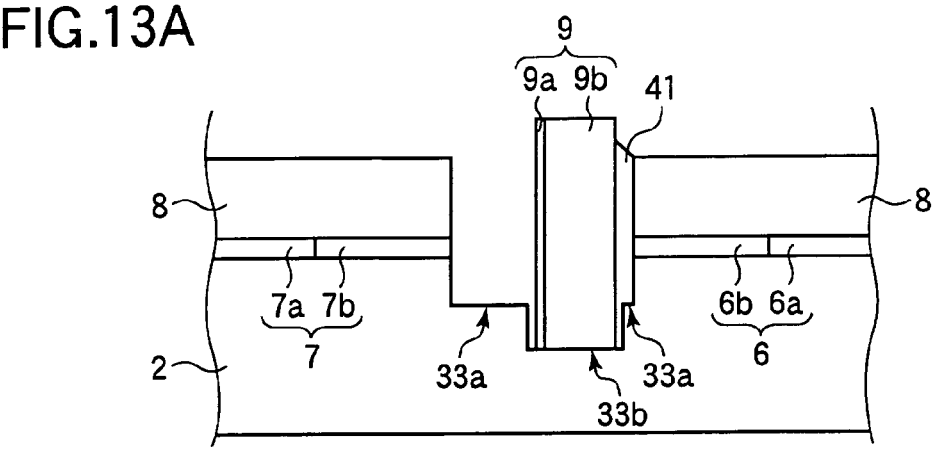
FIGS. 13A to 13C show a method of manufacturing an optical multiplexer/demultiplexer in the third mode for carrying out the invention.
Figure 13B:
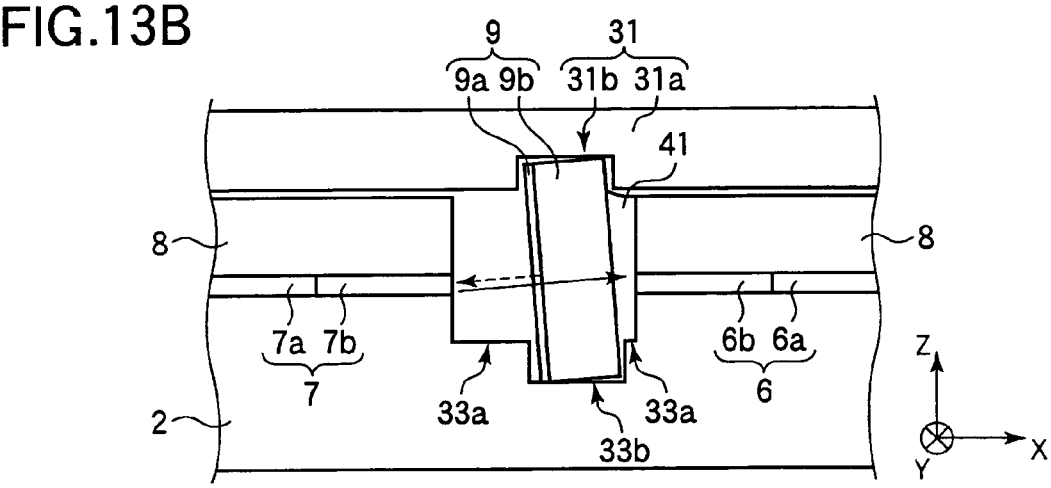
Figure 13C:
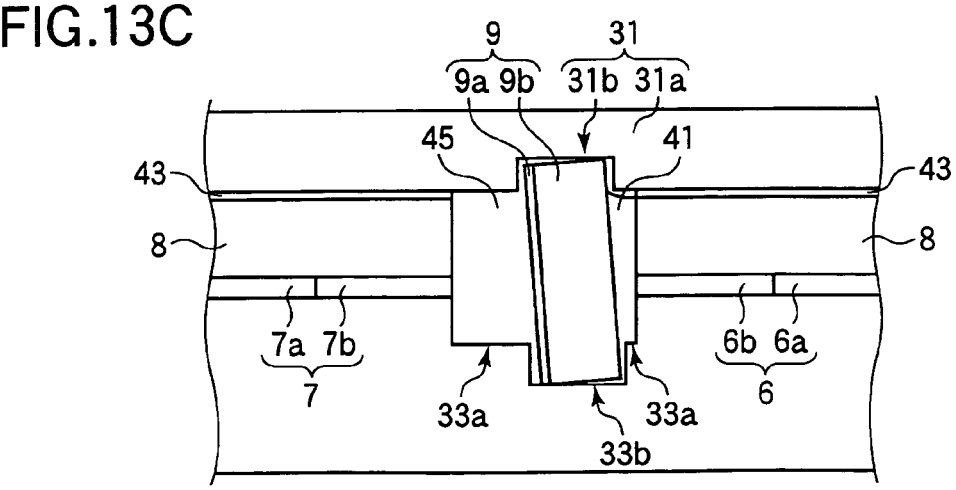

A method of manufacturing an optical multiplexer/demultiplexer in the present mode for carrying out the invention will now be described with reference to FIGS. 13A to 13C. FIGS. 13A to 13C are views of steps for manufacturing the neighborhood of an optical filter 9 of an optical multiplexer/demultiplexer 30 taken in the direction of the Y-axis as shown in FIG. 8.

First, optical filters 5, 6 and 7 with a lens are secured on a substrate 2 and a groove 33*a* is formed using a method similar to the steps for manufacturing the optical multiplexer/demultiplexer 1 in the first mode for carrying out the invention described with reference to FIGS. 5A to 5F and the steps for manufacturing the optical multiplexer/demultiplexer 20 in the second mode for carrying out the invention described with reference to FIGS. 7A to 7C.

Next, as shown in FIG. 13A, a setting groove 33*b* is formed inside the groove 33*a*. The setting groove 33*b* is formed with a width that is slightly greater than the thickness of an optical filter 9. Next, the optical filter 9 is set in the setting groove 33*b* such that a surface of an optical element substrate 9*b* faces the optical fiber 6 with a lens, the surface having no thin film 9*a* formed thereon. Next, a gap between a side surface of the groove 33*a* on which a light entering/exiting end face of the optical fiber 6 with a lens is exposed and the optical element substrate 9*b* is filled with an ultraviolet-set resin 41. The optical filter 9 is held on the side surface of the groove 33*a* by surface tension of the resin 41.

Next, as shown in FIG. 13B, the groove 33*a* is covered with an inclination adjusting member 31, and a flat plate member 31*a* is disposed on optical fiber securing plates 8 such that at least a part of the top surface of the optical filter 9 protruding from the groove 33*a* contacts a bottom surface of a contact groove 31*b*. Light is then made to enter the optical fiber 5 with a lens (not shown in FIGS. 13A to 13C). Next, the flat plate member 31*a* is shifted on the optical fiber securing plates 8 while measuring the quantity of light which has exited the optical fiber 5 with a lens and which has been reflected by the optical filter 9 at an end of a single-mode optical fiber 7*a* (not shown). The flat plate member 31*a* may be shifted in a direction across the groove 33*a* in contact with the optical filter 9 or shifted by rotating it in contact with the optical filter 9 about an axis that is substantially orthogonal to a plane including the optical fibers 5 and 7 with a lens.

The angle of the optical filter 9 is thus adjusted. For example, even when the exit angle of light exiting the optical fiber 5 with a lens deviates from a design value due to eccentricity of the fiber, the exiting light can be made to perpendicularly impinge upon the light entering surface of the optical filter 9 by correcting the angle of the surface. Next, when the quantity of resultant reflected light reaches a maximum, the resin 41 is set by irradiating it with ultraviolet light. The optical filter 9 is thus secured in the groove 33*a* at an optimum angle.

Next, as shown in FIG. 13C, a thermoset resin 43 is poured into a gap between the flat plate member 31*a* and the optical fiber securing plates 8. The resin 43 spreads throughout the gap because of capillarity. The resin 43 is then set by heating it along with the inclination adjusting member 31 and the optical fiber securing plates 8. The inclination adjusting member 31 is thus secured to the optical fiber securing plates 8. The optical filter 9 is reliably secured between the contact groove 31*b* and the setting groove 33*b* with the optimum angle maintained. Next, a gap between the thin film 9*a* and the end face of the optical fiber 7 with a lens is filled with a resin 45 having a predetermined refractive index, and the resin 45 is heated to be gelled. An optical multiplexer/demultiplexer 30 is thus completed.

As described above, according to the method of manufacturing an optical multiplexer/demultiplexer in the present mode for carrying out the invention, the angle of the optical filter 9 can be adjusted using the inclination adjusting member 31 before the optical filter 9 is secured in the groove 33*a*. Therefore, light which has exited the optical fiber 5 with a lens and which has been reflected by the optical filter 9 can be properly coupled to the optical fiber 7 with a lens even when the optical filter 9 is disposed in the setting groove 33*b* at an inclination or even when there is a deviation of the exit angle of the light exiting the optical fiber 5 with a lens because of eccentricity of the optical axis of the fiber.

As thus described, the present mode for carrying out the invention allows stable manufacture of high performance optical multiplexers/demultiplexers 30 in which reflected light from the optical filter 9 is properly coupled to the optical fiber 7 with a lens. The optical multiplexers/demultiplexers 30 can be manufactured with an improved yield at a low cost.

The invention is not limited to the above-described modes for carrying out the same and may be modified in various ways. While the optical multiplexer/demultiplexer 30 in the third mode for carrying out the invention employs the optical filter 9 as an optical element, this is not limiting the invention. For example, light can be demultiplexed using a mirror, beam splitter or the like to provide the same advantages as those in the above-described modes for carrying out the invention.

The optical multiplexer/demultiplexer 30 in the third mode for carrying out the invention has a configuration in which the thin film 9*a* of the optical filter 9 is provided in a face-to-face relationship with the light entering/exiting end face of the optical fiber 5 with a lens and in which a light beam from the optical fiber 5 with a lens is reflected by the thin film 9a after passing through the region extending the distance L1. The invention is not limited to the configuration. For example, the orientation of the optical filter 9 in the groove 33a may be the reverse of the orientation shown in FIGS. 9A and 9B. Specifically, the optical element substrate 9b may be provided in a face-to-face relationship with the light entering/exiting end face of the optical fiber 5 with a lens, and the thin film 9a may be provided in face-to-face relationship with the light entering/exiting end face of the optical fiber 6 with a lens. The same effects as those in the above-described modes for carrying out the invention can be achieved even in a configuration in which a light beam from the optical fiber 5 with a lens is reflected by the thin film 9a after passing through the region extending the distance L1 and the optical element substrate 9b as long as the thin film 9a is located in a position where the light from the optical fiber 5 with a lens is reflected.

Although the optical multiplexer/demultiplexer 30 in the third mode for carrying out the invention has the setting groove 33b, this is not limiting the invention. For example, the optical multiplexer/demultiplexer 30 may lack the setting groove 33b. When the groove 33a is filled with the resin 41 after disposing the optical filter 9 therein, the optical filter 9 is held on a side surface of the groove 33a because of surface tension of the resin 41. As a result, the optical filter 9 is unlikely to fall within the groove 33a. It is therefore possible to adjust the angle of the optical filter 9 to provide the same effects as those in the above-described modes for carrying out the invention.

While the optical multiplexer/demultiplexer 30 in the third mode for carrying out the invention has the setting groove 33b whose bottom surface and side surfaces are substantially orthogonal to each other, this is not limiting the invention. For example, the intersections between the bottom surface and the side surfaces of the setting groove 33b may be formed in a rounded configuration. In such a case, linear contact is achieved between a corner section of the optical filter 9 and such an intersection of the setting groove 33b. Since this allows the optical filter 9 to be moved more easily inside the setting groove 33b, the angle of the optical filter 9 can be more accurately adjusted.

While the optical multiplexer/demultiplexer 30 in the third mode for carrying out the invention has the inclination adjusting member 31 including the flat plate member 31a formed with the contact groove 31b, this is not limiting the invention. For example, it is not essential that the inclination adjusting member 31 is formed with the contact groove 31b as long as the flat plate member 31a can be put in contact with the top surface of the optical filter 9. In such a case, when the flat plate member 31a is shifted in a direction across the groove 33a or shifted by rotating the same, a frictional force generated at the contact surface between the top surface of the optical filter 9 and the flat plate member 31a allows the angle of the optical filter 9 to be adjusted. It is therefore possible to achieve the same effects as those in the above-described modes for carrying out the invention.

While the optical multiplexer/demultiplexer 30 in the third mode for carrying out the invention has the inclination adjusting member 31 which is formed like a thin rectangular parallelepiped, this is not limiting the invention. It is not essential to form the inclination adjusting member 31 in the form of a thin rectangular parallelepiped as long as, for example, it has a contact surface which contacts the top surface of the optical filter 9. In this case again, it is possible to achieve the same effects as those in the above-described modes for carrying out the invention because a frictional force generated at the contact surface allows the angle of the optical filter 9 to be adjusted.

What is claimed is:

1. An optical multiplexer/demultiplexer comprising:
   a substrate;
   a base groove formed on the substrate;
   a first linear positioning groove formed on the substrate, the first positioning groove being formed on a first side of the base groove at a predetermined angle to the base groove;
   a second linear positioning groove formed on the substrate, the second positioning groove being formed on a second side of the base groove oppositely to and coaxially with the first positioning groove;
   a third linear positioning groove formed on the substrate and on the first side of the base groove such that it is at a smaller distance to the first positioning groove as it becomes closer to the base groove;
   an optical element provided in the base groove for multiplexing or/and demultiplexing light;
   a first optical fiber with a lens provided in the first positioning groove, the first optical fiber having a graded index lens attached to an end thereof and facing the base groove at an end face thereof;
   a second optical fiber with a lens provided in the second positioning groove, the second optical fiber having a graded index lens attached to an end thereof and facing the base groove at an end face thereof;
   a third optical fiber with a lens provided in the third positioning groove, the third optical fiber having a graded index lens attached to an end thereof and facing the base groove at an end face thereof; and
   an inclination adjusting member for adjusting the inclination of the optical element relative to a plane in which the optical fibers are disposed such that light which has excited the first optical fiber with a lens is coupled to the third optical fiber with a lens.

2. An optical multiplexer/demultiplexer according to claim 1, wherein the end faces of the first through third optical fibers with a lens are formed at an angle to the optical axes of the first through third optical fibers with a lens such that lines normal to the end faces are orthogonal to the optical element.

3. An optical multiplexer/demultiplexer according to claim 1, wherein the inclination adjusting member includes a flat plate member which extends across the base groove to contact the optical element.

4. An optical multiplexer/demultiplexer according to claim 3, wherein the flat plate member has a contact groove in the region thereof where it contacts the optical element.

5. An optical multiplexer/demultiplexer according to claim 1, wherein the base groove includes a setting groove in which the optical element is set.

6. An optical multiplexer/demultiplexer according to claim 1, wherein the graded index lens is a graded index optical fiber.

7. An optical multiplexer/demultiplexer according to claim 1, wherein the optical element is an optical filter or a mirror.

8. An optical multiplexer/demultiplexer comprising:
a substrate;
a base groove formed on the substrate;
a first linear positioning groove formed on the substrate, the first positioning groove being formed on a first side of the base groove at a predetermined angle to the base groove;
a second linear positioning groove formed on the substrate, the second positioning groove being formed on a second side of the base groove oppositely to and coaxially with the first positioning groove;
a third linear positioning groove formed on the substrate and on the first side of the base groove such that it is at a smaller distance to the first positioning groove as it becomes closer to the base groove;
an optical element provided in the base groove for multiplexing or/and demultiplexing light;
a first optical fiber with a lens provided in the first positioning groove, the first optical fiber having a graded index lens attached to an end thereof and facing the base groove at an end face thereof;
a second optical fiber with a lens provided in the second positioning groove, the second optical fiber having a graded index lens attached to an end thereof and facing the base groove at an end face thereof; and
a third optical fiber with a lens provided in the third positioning groove, the third optical fiber having a graded index lens attached to an end thereof and facing the base groove at an end face thereof;
wherein the optical element is a thin film provided on an optical element substrate and wherein a thickness L3 of the optical element substrate satisfies:

$$L3=[(\tan\theta f-\tan\theta 1)(L1+L4)+(\tan\theta f-\tan\theta 2)\times L2]/(\tan\theta 3-\tan\theta f)$$

where $\theta 1=\sin^{-1}\{(n0\times\sin\theta f)/n1\}$; $\theta 2=\sin^{-1}\{(n0\times\sin\theta f)/n2\}$; and $\theta 3=\sin^{-1}\{(n0\times\sin\theta f)/n3\}$, L1 representing the distance from the first optical fiber with a lens to the thin film, L2 representing the thickness of the thin film, L3 representing the thickness of the optical element substrate, L4 representing the distance from the optical element substrate to the second optical fiber with a lens, n0 representing the axial refractive index of the graded index lenses, n1 representing the refractive index in the base groove, n2 representing the effective refractive index of the thin film, n3 representing the refractive index of the optical element substrate, θf representing the predetermined angle.

9. An optical multiplexer/demultiplexer according to claim 8, wherein the end faces of the first through third optical fibers with a lens are formed at an angle to the optical axes of the first through third optical fibers with a lens such that lines normal to the end faces are orthogonal to the optical element.

10. A method of manufacturing an optical multiplexer/demultiplexer comprising the steps of:
forming two linear positioning grooves on a substrate by cutting the substrate such that the grooves intersect each other at a predetermined angle;
forming a base groove extending across the positioning grooves in the region where the two linear positioning grooves intersect each other;
disposing optical fibers with a lens having a graded index lens formed at an end thereof in the positioning grooves such that end faces of the optical fibers with a lens face the base groove;
providing a block in the base groove and securing the optical fibers with a lens with the ends of the fibers abutted on the block;
cutting the ends of the optical fibers with a lens thus bonded and secured; and
mounting an optical element in the base groove between the optical fibers with a lens.

11. A method of manufacturing an optical multiplexer/demultiplexer according to claim 10, wherein the step of mounting an optical element is followed by the step of moving the optical element in the direction of the width of the base groove to adjust the optical path of light which exits a predetermined optical fiber with a lens and which is reflected by the optical element to be coupled to another optical fiber with a lens.

12. A method of manufacturing an optical multiplexer/demultiplexer according to claim 10, further comprising the step of adjusting the optical path of light which has exited a predetermined optical fiber with a lens and which is coupled to another optical fiber with a lens by changing the refractive index of a substance with which the base groove is filled.

13. A method of manufacturing an optical multiplexer/demultiplexer according to claim 10, wherein the graded index lenses are graded index optical fibers.

14. A method of manufacturing an optical multiplexer/demultiplexer according to claim 10, wherein the optical element is an optical filter or mirror.

15. A method of manufacturing an optical multiplexer/demultiplexer comprising the steps of:
forming two linear positioning grooves on a substrate by cutting the substrate such that the grooves intersect each other at a predetermined angle;
disposing an optical fiber with a lens, which is constituted by optical fibers attached to both ends of a first graded index lens, in one of the positioning grooves and disposing and securing another optical fiber with a lens, which is an optical fiber attached to a second graded index lens, in the other positioning groove;
forming a base groove extending across the positioning grooves by cutting an intermediate part of the first graded index lens, an end of the second graded index lens, and the substrate and forming another groove within the base groove so as to reduce any deviation of a light entering the another optical fiber with a lens from an optical axis; and
mounting an optical element in the another groove.

16. A method of manufacturing an optical multiplexer/demultiplexer according to claim 15, wherein the step of mounting an optical element is followed by the step of moving the optical element in the direction of the width of the base groove to adjust the optical path of light which exits a predetermined optical fiber with a lens and which is reflected by the optical element to be coupled to another optical fiber with a lens.

17. A method of manufacturing an optical multiplexer/demultiplexer according to claim 15, further comprising the step of adjusting the optical path of light which has exited a predetermined optical fiber with a lens and which is coupled to another optical fiber with a lens by changing the refractive index of a substance with which the base groove is filled.

18. A method of manufacturing an optical multiplexer/demultiplexer according to claim 15, wherein the graded index lenses are graded index optical fibers.

19. A method of manufacturing an optical multiplexer/demultiplexer according to claim 15, wherein the optical element is an optical filter or mirror.

20. A method of manufacturing an optical multiplexer/demultiplexer comprising the steps of:
  forming a base groove on a substrate;
  forming the substrate with a first linear positioning groove at a predetermined angle to the base groove, a second linear positioning groove located coaxially with the first positioning groove with the base groove interposed between them, and a third linear positioning groove which defines a smaller gap with the first positioning groove as it becomes closer to the base groove when viewed in parallel with the extending direction of the base groove;
  disposing and securing first through third optical fibers with a lens each having a graded index lens at an end thereof in the first through third positioning grooves, respectively, such that the graded index lenses are exposed in the base groove;
  setting an optical element in the base groove; and
  adjusting the inclination of the optical element relative to a plane in which the optical fibers are disposed such that light which has exited the first optical fiber with a lens is coupled to the third optical fiber with a lens.

21. A method of manufacturing an optical multiplexer/demultiplexer according to claim 20, wherein an inclination adjusting member including a flat plate member is placed over the base groove and wherein the flat plate member is slid in contact with the optical element in the base groove to incline the optical element.

22. A method of manufacturing an optical multiplexer/demultiplexer according to claim 21, wherein the flat plate member is slid across the base groove to incline the optical element relative to a plane including the first and the third optical fibers with a lens.

23. A method of manufacturing an optical multiplexer/demultiplexer according to claim 21, wherein the flat plate member is rotationally slid to rotate the optical element about an axis substantially orthogonal to a plane including the first and the third optical fibers with a lens.

* * * * *